US012723114B2

(12) United States Patent
Lee et al.

(10) Patent No.: US 12,723,114 B2
(45) Date of Patent: Sep. 1, 2026

(54) COMPLEX CATALYST CONTAINING IMINE-BASED LIGAND FOR POLYMERIZING CYCLIC OLEFIN-BASED MONOMER AND METHOD FOR PREPARING CYCLIC OLEFIN-BASED POLYMER USING SAME

(71) Applicant: KYUNGPOOK NATIONAL UNIVERSITY INDUSTRY-ACADEMIC COOPERATION FOUNDATION, Daegu (KR)

(72) Inventors: Hyo Sun Lee, Daegu (KR); Hyeonuk Yeo, Daegu (KR); Ah Rim Jeong, Chilgok-gun (KR); Kyeonghun Kim, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 529 days.

(21) Appl. No.: 18/276,049

(22) PCT Filed: Feb. 8, 2022

(86) PCT No.: PCT/KR2022/095023

§ 371 (c)(1),
(2) Date: Aug. 7, 2023

(87) PCT Pub. No.: WO2022/173280

PCT Pub. Date: Aug. 18, 2022

(65) Prior Publication Data

US 2024/0124624 A1 Apr. 18, 2024

(30) Foreign Application Priority Data

Feb. 9, 2021 (KR) ........................ 10-2021-0018600
Feb. 9, 2021 (KR) ........................ 10-2021-0018604

(51) Int. Cl.
*C08F 32/08* (2006.01)
*B01J 31/18* (2006.01)
(Continued)

(52) U.S. Cl.
CPC ........... *C08F 32/08* (2013.01); *B01J 31/1815* (2013.01); *B01J 31/183* (2013.01); *C08F 2/06* (2013.01); *C08F 4/6028* (2013.01); *C08F 4/7096* (2013.01)

(58) Field of Classification Search
None
See application file for complete search history.

(56) References Cited

U.S. PATENT DOCUMENTS

| | | | |
|---|---|---|---|
| 5,468,819 | A | 11/1995 | Goodall et al. |
| 6,455,650 | B1 | 9/2002 | Lipian et al. |
| 2004/0132936 | A1 | 7/2004 | Tagge et al. |

FOREIGN PATENT DOCUMENTS

WO WO2019205309 A1 10/2019

OTHER PUBLICATIONS

Laine, T. V. et al., "Pyridinylimine-based nickel(II) and palladium(II) complexes: preparation, structural characterization and use as alkene polymerization catalysts". Journal of Organometallic Chemistry, 2000, 606(2), 112-124. (Year: 2000).*

(Continued)

*Primary Examiner* — Richard A. Huhn
(74) *Attorney, Agent, or Firm* — STIP Law Group, LLC

(57) ABSTRACT

Proposed are a complex catalyst containing an imine-based ligand for polymerizing a cyclic olefin-based monomer and a method of preparing a cyclic olefin-based polymer using (Continued)

the same. More particularly, proposed are a complex catalyst containing an imine-based ligand for polymerizing a cyclic olefin-based monomer, which can provide the complex catalyst containing the imine-base ligand having high activity in polymerizing the cyclic olefin-based monomer and can prepare a cyclic olefin-based polymer with high activity by polymerizing the cyclic olefin-based monomer in the presence of the complex catalyst containing the imine-based ligand, and a method of preparing a cyclic olefin-based polymer using the same.

10 Claims, 5 Drawing Sheets

(51) Int. Cl.

| | |
|---|---|
| ***C08F 2/06*** | (2006.01) |
| ***C08F 4/602*** | (2006.01) |
| ***C08F 4/70*** | (2006.01) |

(56) References Cited

OTHER PUBLICATIONS

Kim, D. et al., "N,N',X-bidentate versus N,N',X-tridentate N-substituted 2-iminomethylpyridine- and 2-iminomethylquinolinecoordinated palladium(II) complexes". Journal of Coordination Chemistry, 2014, 67(13), 2312-2329. (Year: 2014).*

Charpentier, P. A. et al., "Effect of aluminoxane on semi-batch polymerization of ethylene using zirconocene dichloride". Polymer, 1998, 39(25), 6501-6511. (Year: 1998).*

International search report of PCT/KR2022/095023, May 31, 2022, English translation.

Timo V. Laine et al, Pyridinylimine-based nickel(II) and palladium(II) complexes: preparation, structural characterization and use as alkene polymerization catalysts, Journal of Oreganometallic Chemistry, 2000, vol. 606, pp. 112-124, Elsevier Sciences S. A, Amsterdam, Netherlands.

Dongil Kim et al, N,N',X-bidentate versus N,N',X-tridentate N-substituted 2-iminomethylpyridine- and 2-iminomethylquinolinecoordinated palladium(II) complexes, Journal of Coordination Chemistry, 2014, vol. 67, No. 13, pp. 2312-2329, Taylor & Francis Group, Abingdon, United Kingdom.

Sunghoon Kim et al, Palladium(II) complexes containing N, N0-bidentate N-cycloalkyl 2-iminomethylpyridine and 2-iminomethylquinoline: Synthesis, characterisation and methyl methacrylate polymerisation, Polyhedron, 2014, vol. 69, pp. 149-155, Elsevier, Amsterdam, Netherlands.

April D. Hennis et al, Novel, Efficient, Palladium-Based System for the Polymerization of Norbornene Derivatives: Scope and Mechanism, Organometallics, 2001, vol. 20, pp. 2802-2812, American Chemical Society, Washington, USA.

Tina M Trnka and Robert H. Grubbs, The Development of L2X2RudCHR Olefin Metathesis Catalysts: An Organometallic Success Story, Accounts of Chemical Research, 2001, vol. 34, No. 1, pp. 18-29, American Chemical Society, Washington, USA.

Jennifer A. Love et al, Synthesis, Structure, and Activity of Enhanced Initiators for Olefin Metathesis, JACS Articles, Jul. 2003, vol. 125, pp. 10103-10109, American Chemical Society, Washington, USA.

Shirley Lin et al, Steric and electronic effects of R in (2-(4-R-C6 H4) ) indenyl)2 ZrCl catalysts on the synthesis of elastomeric polypropylene, Journal of Molecular Catalyss A: Chemical, 1998, vol. 136, pp. 23-33, Elsevier, Amsterdam, Netherlands.

David R. Moore et al, Electronic and Steric Effects on Catalysts for CO2/Epoxide Polymerization: Subtle Modifications Resulting in Superior Activities, Angew. Chem. Int Ed, 2002, vol. 41, No. 14, pp. 2599-2602, Wiley-Vch Verlag GmbH, Weinheim, Germany.

* cited by examiner

[fig.1]
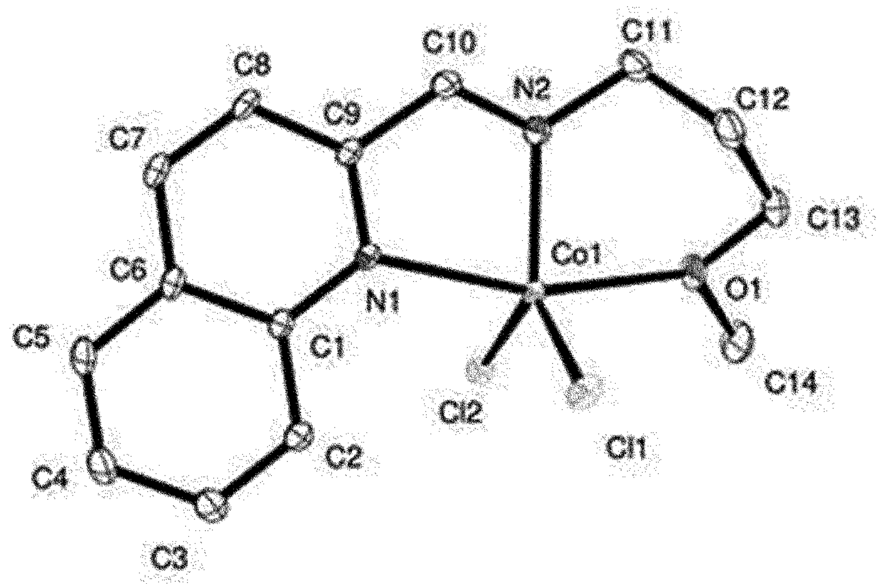
[fig.2]
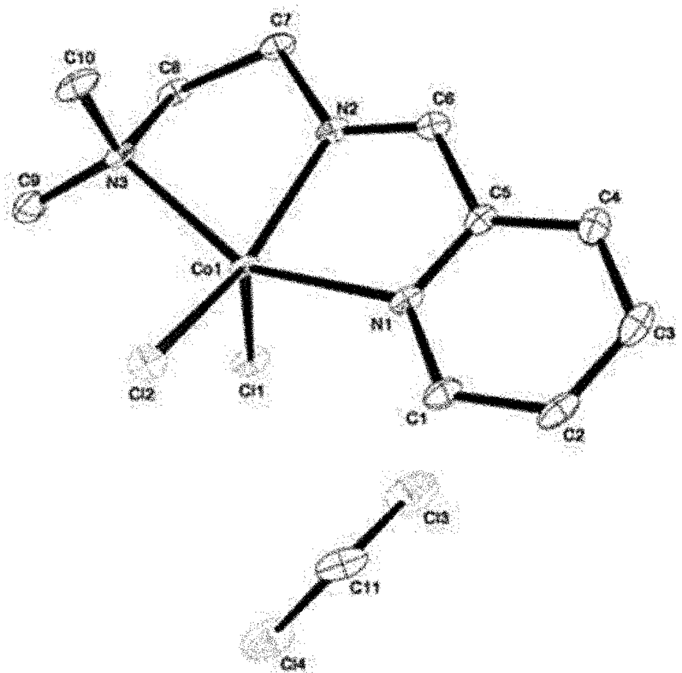

[fig.3]
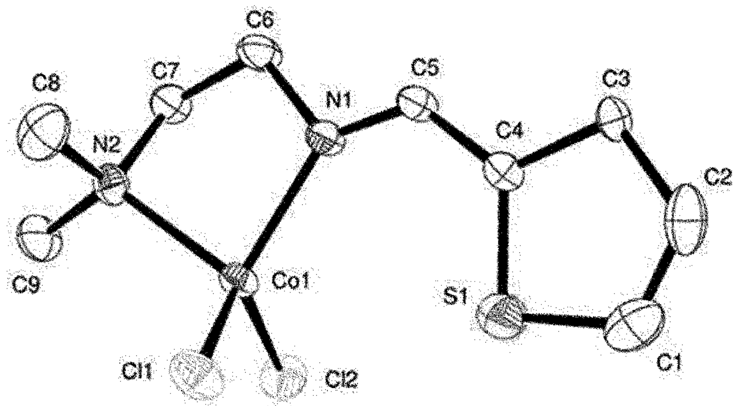
[fig.4]
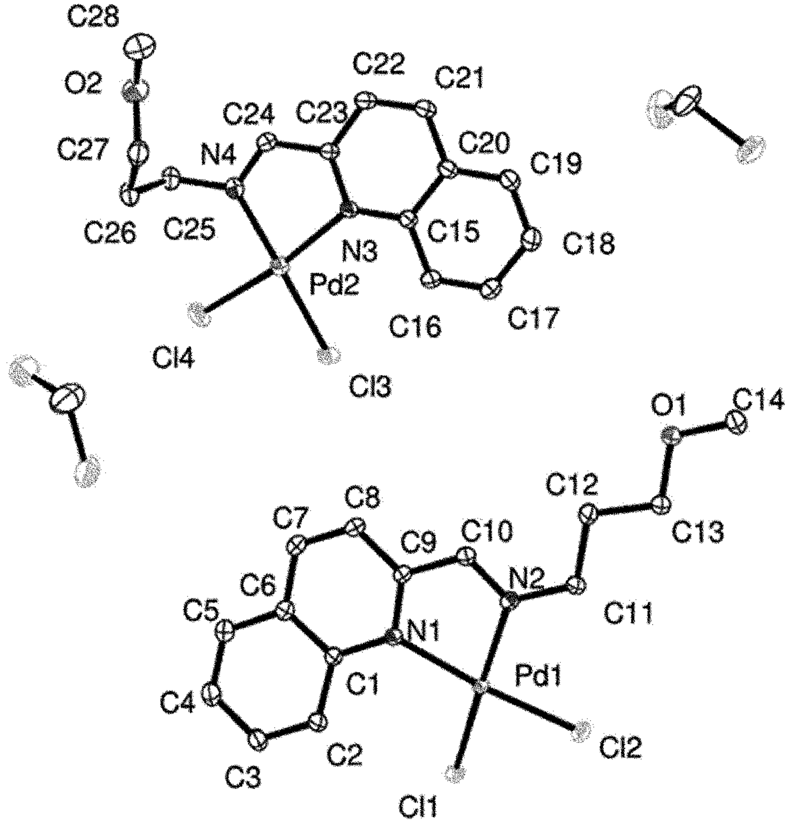

[fig.5]
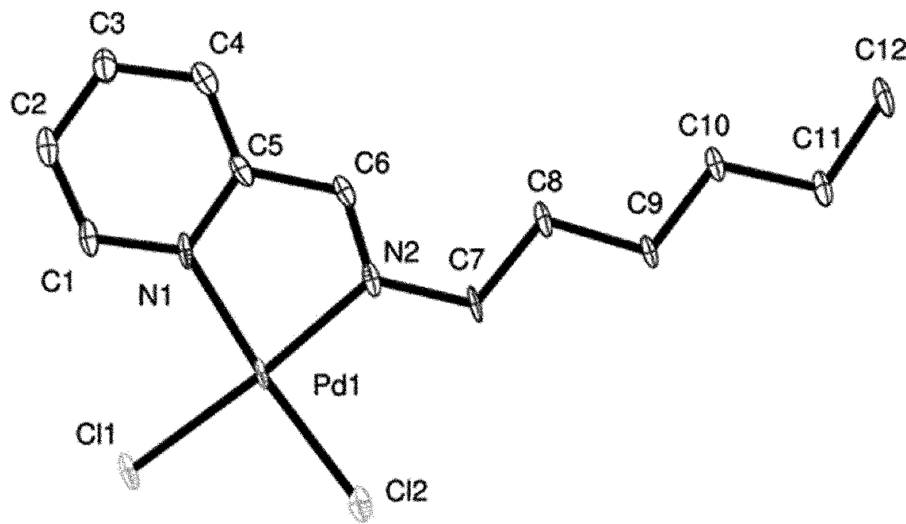
[fig.6]
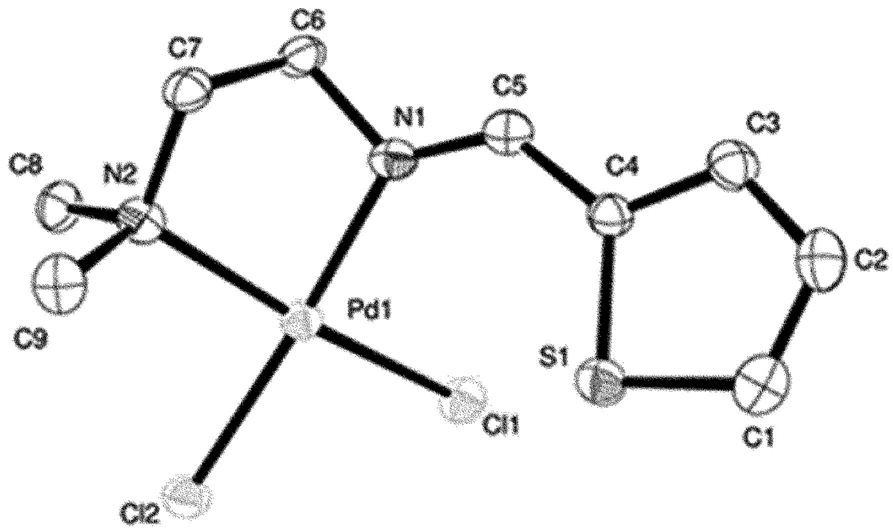

[fig.7]
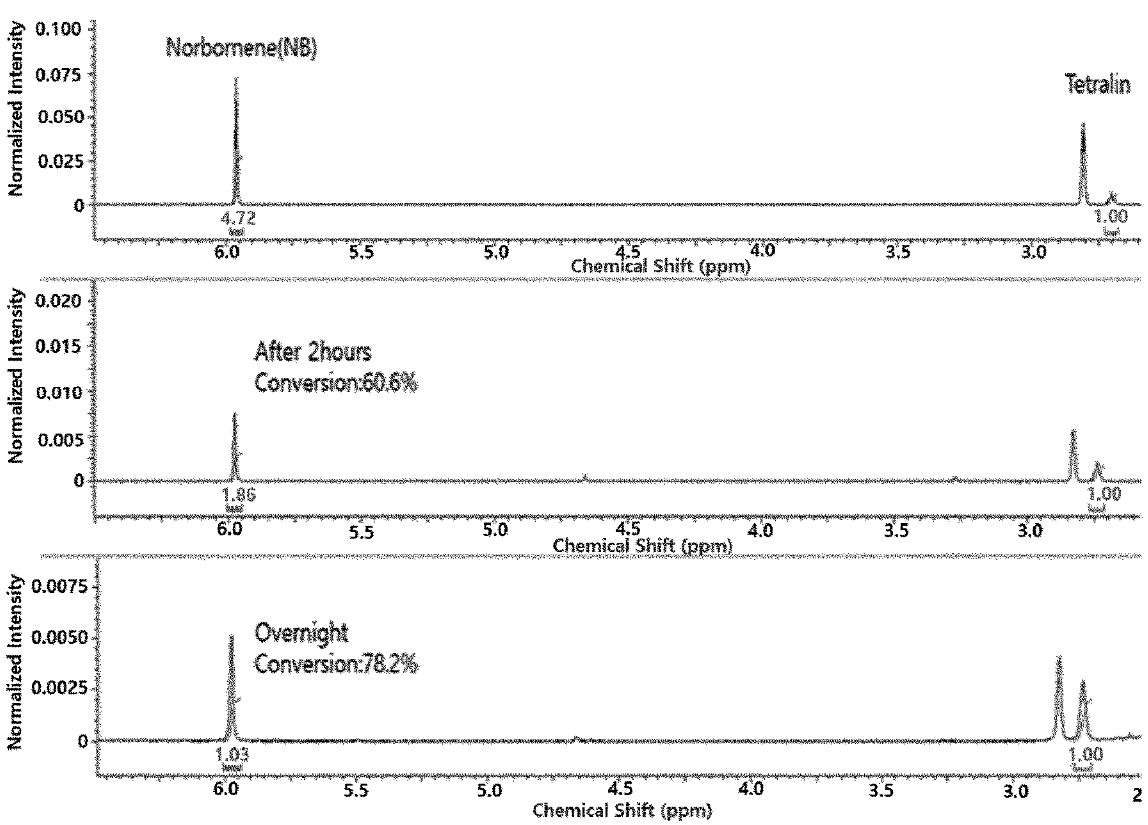

[fig.8]
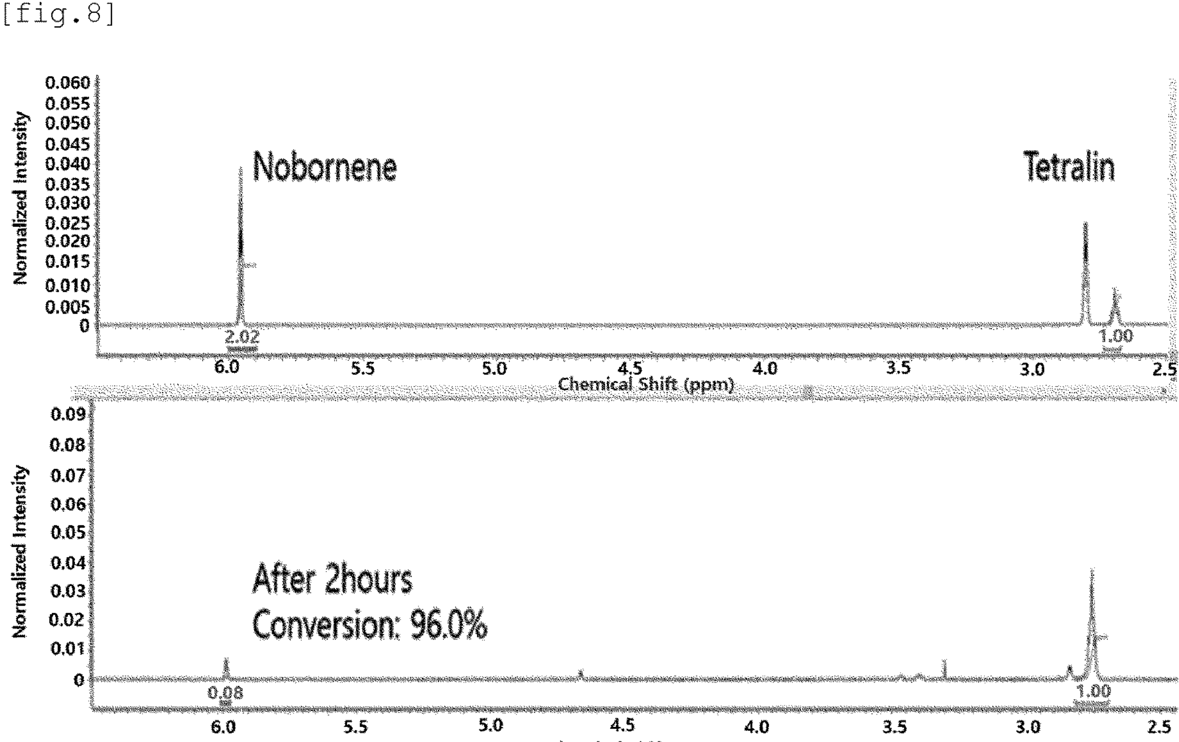

COMPLEX CATALYST CONTAINING IMINE-BASED LIGAND FOR POLYMERIZING CYCLIC OLEFIN-BASED MONOMER AND METHOD FOR PREPARING CYCLIC OLEFIN-BASED POLYMER USING SAME

CROSS-REFERENCE TO RELATED APPLICATION

This application is the U.S. National Phase under 35 U.S.C. § 371 of International Application No. PCT/KR2022/095023, filed on Feb. 8, 2022, which in turn claims the benefit of Korean Applications No. 10-2021-0018604, filed on Feb. 9, 2021, and No. 10-2021-0018600, filed on Feb. 9, 2021, the entire contents of which is incorporated herein for all purposes by this reference.

BACKGROUND OF THE DISCLOSURE

1. Field of the Disclosure

The present disclosure relates to a complex catalyst containing an imine-based ligand for polymerizing a cyclic olefin-based monomer and to a method of preparing a cyclic olefin-based polymer using the same. More particularly, the present disclosure relates to a method of preparing a cyclic olefin-based polymer by performing addition polymerization of a cyclic olefin-based monomer in the presence of the catalyst for polymerizing the cyclic olefin-based monomer, using a complex in which a metal halide is bonded to an imine-based ligand as a catalyst for polymerizing a cyclic olefin-based monomer.

2. Description of the Related Art

Cyclic olefin-based polymers, composed of cyclic olefin-based monomers such as norbornene, have excellent transparency, heat resistance, and chemical resistance as well as extremely low birefringence and water absorption, compared to existing olefin-based polymers. As a result, cyclic olefin-based polymers have a wide range of applications, including optical materials, such as CDs, DVDs, and plastic optical fibers (POF), information electronic materials, such as capacitor films and low-dielectric materials, and medical materials, such as low-absorbent syringes, and blister packaging.

In particular, a norbornene polymer, an amorphous polymer, has a high glass transition temperature, a high refractive index, and a low dielectric constant. As a result, norbornene polymers are being widely used as electronic materials, and a great deal of research on norbornene polymers has been actively conducted by Heitz et al.

As catalysts used for polymerizing such cyclic olefin-based polymers, a catalyst complex containing an organic phosphine compound, serving as a cocatalyst, as a sigma electron donor ligand has been mainly used. For example, U.S. Pat. registration No. 6,455,650 discloses a method of polymerizing a norbornene-based monomer by using $[(R')_zM(L')_x(L'')_y]_b[WCA]_d$ and the like as a catalyst complex where hydrocarbon containing a hydrocarbyl group, such as an allyl group and the like, and a phosphine compound is used as a ligand. In addition, the document reported by Lipian et al. (Non-Patent Document 0001) disclosed norbornene polymerization by activating $[(1,5\text{-cyclooctadiene})(CH_3)Pd(Cl)]$ using a phosphine such as $PPh_3$ and a cocatalyst such as $[[Na]^+[B(3,5\text{-}(CF_3)_2C_6H_3)_4]^-$ However, separate addition of a phosphine cocatalyst required a separate process to convert a catalyst precursor into an active catalyst and caused a problem of poor industrial usefulness due to the excessive use of expensive cocatalysts.

On the other hand, among various methods for improving polymerization catalyst performance, a method of partially substituting a portion of a ligand with various functional groups has been recently proposed so as to consider an electronic effect of the ligand. The improvement of catalytic performance according to a change in the ligand electron effect can be found in various documents. For example, the improvement of catalytic activity by modifying a substituent of a Grubbs ruthenium carbene catalyst ligand while adjusting an electronic effect of the ligand has been published (Non-Patent Documents 0002 and 0003).

Looking into catalysts used for polymer synthesis, Waymouth discovered that an electronic effect of a ligand plays a key role in controlling the stereoselectivity of propylene polymerized using a zirconocene catalyst. (Non-Patent Document 0004). In addition, when copolymerizing carbon dioxide (CO2) and epoxide using a 13-diiminate zinc alkoxide catalyst, Coates announced that a polymerization rate of the polymer was dramatically increased by modifying a portion of a ligand with a cyano functional group (Non-Patent Document 0005).

However, there have been no reports to date of improving polymerization performance of a metal catalyst according to a ligand, using a complex in which a metal halide is bonded to an imine-based ligand when polymerizing a cyclic olefin-based monomer.

DOCUMENT OF RELATED ART

Patent Document (Patent Document 0001) U.S. Pat. Registration No. 5,468,819 (published on Nov. 21, 1995)

(Patent Document 0002) U.S. Pat. Registration No. 6,455,650 (published on May 2, 2002)

Non-Patent Document (Non-Patent Document 0001) Sen, et al., *Organometallics* 2001, Vol. 20, 2802-2812

(Non-Patent Document 0002) Trnka, T. M.; Grubbs, R. H. *Acc. Chem. Res.* 2001, 34, 18-29.

(Non-Patent Document 0003) Love, J. A.; Sanford, M. S.; Day, M. W.; Grubbs, R. H. *J. Am. Chem. Soc.* 2003, 125, 10103-10109.

(Non-Patent Document 0004) Lin, S.; Hauptman, E.; Lal, T. K.; Waymouth, R. M.; Quan, R. W.; Ernst, A. B. *J. Mol. Catal. A: Chem.* 1998, 136, 23-33.

(Non-Patent Document 0005) Moore, D. R.; Cheng, M.; Lobkovsky, E. B.; Coates, G. W. *Angew. Chem., Int. Ed.* 2002, 41, 2599-2602.

SUMMARY OF THE INVENTION

An objective of the present disclosure is to provide a complex catalyst containing an imine-based ligand for polymerizing a cyclic olefin-based monomer having high activity in polymerizing the cyclic olefin-based monomer.

In addition, another objective of the present disclosure is to provide a method of preparing a cyclic olefin-based polymer by polymerizing a cyclic olefin-based monomer in the presence of the complex catalyst containing the imine-based ligand. The method is capable of preparing the cyclic olefin-based polymer with high activity.

In order to achieve the above objectives, one embodiment of the present disclosure provides a complex catalyst containing an imine-based ligand for polymerizing a cyclic olefin-based monomer, the catalyst including at least one among compounds represented by Formulas 1 to 3.

[Formula 1]

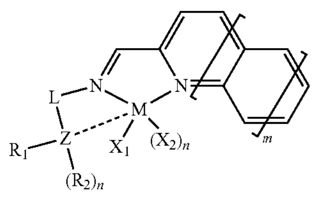

[Formula 2]

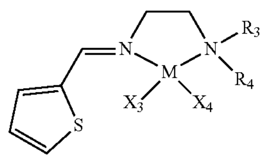

[Formula 3]

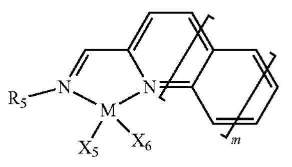

In Formulas 1 to 3, M is palladium or cobalt, $R_1$ to $R_5$ are the same or different and are each independently selected from the group consisting of a hydrogen atom, a substituted or unsubstituted alkyl group, a substituted or unsubstituted cycloalkyl group, and a substituted or unsubstituted aryl group, $X_1$ to $X_6$ are the same or different and are each independently a halogen group, L is $-(CH_2)_y-$ (where y is an integer in a range of 1 to 5), Z is the same or different and are each independently selected from the group consisting of an oxygen atom, a nitrogen atom, a carbon atom, and $-(CH_2)-$, n is an integer of 0 or 1, m is an integer in a range of 0 to 3, and each dotted line indicates the presence or absence of a bond.

In one preferred embodiment of the present disclosure, $X_1$ to $X_6$ of Formulas 1 to 3 may be the same or different and may be each independently Cl or Br.

In one preferred embodiment of the present disclosure, $R_1$ to $R_5$ of Formulas 1 to 3 may be the same or different and may be each independently a substituent selected from the group consisting of a hydrogen atom, a substituted or unsubstituted alkyl group having 1 to 5 carbon atoms, a substituted or unsubstituted cycloalkyl group having 3 to 10 carbon atoms, and a substituted or unsubstituted aryl group having 6 to 20 carbon atoms.

In one preferred embodiment of the present disclosure, the compound represented by Formula 1 may be represented by one of Formulas 1A to 1G.

[Formula 1A]

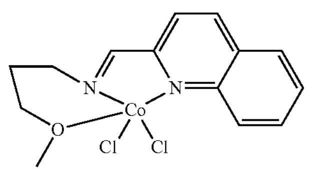

-continued

[Formula 1B]

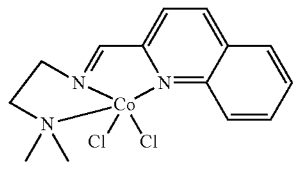

[Formula 1C]

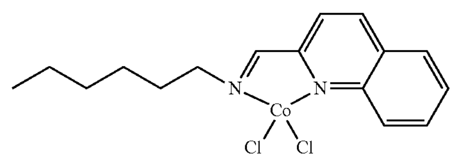

[Formula 1D]

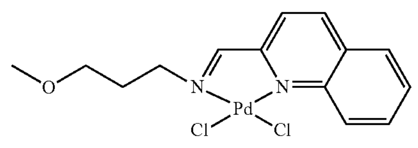

[Formula 1E]

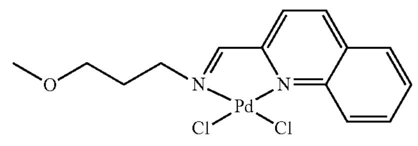

[Formula 1F]

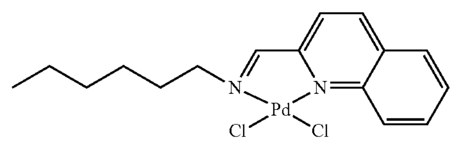

[Formula 1G]

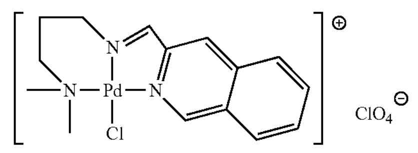

In one preferred embodiment of the present disclosure, the compound represented by Formula 2 may be represented by Formula 2A or 2B.

[Formula 2A]

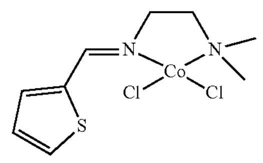

[Formula 2B]

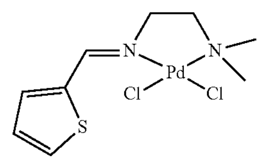

In one preferred embodiment of the present disclosure, the compound represented by Formula 3 may be represented by Formula 3A or 3B.

[Formula 3A]

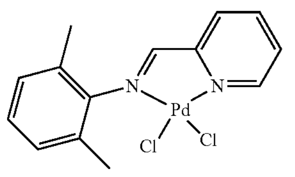

[Formula 3B]

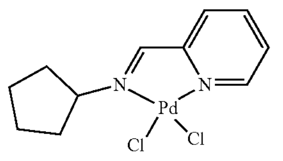

Another embodiment of the present disclosure provides a method of preparing a cyclic olefin-based polymer, the method including performing addition polymerization of a cyclic olefin-based monomer in the presence of the complex catalyst described above.

In another preferred embodiment of the present disclosure, the cyclic olefin-based monomer may include at least one selected from the group consisting of norbornene, dicyclopentadiene, cyclopentadiene, cyclopentene, cyclobutene, cyclohexene, cycloheptene, cyclooctene, and derivatives thereof.

In another preferred embodiment of the present disclosure, the cyclic olefin-based monomer may be a compound represented by Formula 7.

[Formula 7]

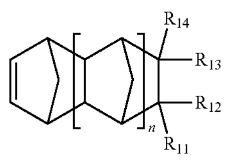

In Formula 7, n is an integer in a range of 0 to 4, and $R_{11}$ to $R_{14}$ are the same or different and are each independently selected from the group consisting of a hydrogen atom, a halogen atom, a hydroxy group, a carboxyl group, a straight-chain or branched-chain alkyl group having 1 to 20 carbon atoms, a cycloalkyl group having 3 to 12 carbon atoms, an aryl group having 6 to 20 carbon atoms, an alkoxy group having 1 to 10 carbon atoms, and an acyl group having 1 to 10 carbon atoms.

In another preferred embodiment of the present disclosure, the addition polymerization of the cyclic olefin-based monomer may be performed in the presence of a cocatalyst with the complex catalyst.

In another preferred embodiment of the present disclosure, the cocatalyst may include at least one selected from the group consisting of modified methylaluminoxane (MMAO), trimethyl aluminum (TMA), triethyl aluminum (TEA), triisobutylaluminum (TIBAL), dimethyl chloro aluminum (DMCA), and diethyl chloro aluminum (DECA).

In another preferred embodiment of the present disclosure, the cocatalyst may be modified methylaluminoxane (MMAO).

In another preferred embodiment of the present disclosure, the addition polymerization may be performed in at least one solvent selected from the group consisting of 1,2-dichlorobenzene, toluene, n-pentane, n-hexane, n-heptane, chlorobenzene, dichloromethane, chloroform, 1,2-dichloroethane, and 1,1,2,2-tetrachloroethane.

According to the present disclosure, a complex catalyst containing an imine-based ligand for polymerizing a cyclic olefin-based monomer having high activity in polymerizing the cyclic olefin-based monomer can be provided. In addition, in the presence of the complex catalyst containing the imine-based ligand, the cyclic olefin-based monomer can be polymerized to prepare a cyclic olefin-based polymer with high activity.

BRIEF DESCRIPTION OF THE DRAWINGS

FIG. 1 is a diagram illustrating an X-ray structure of a cobalt complex catalyst in Preparation Example 1 according to the present disclosure;

FIG. 2 is a diagram illustrating an X-ray structure of a cobalt complex catalyst in Preparation Example 2 according to the present disclosure;

FIG. 3 is a diagram illustrating an X-ray structure of a cobalt complex catalyst in Preparation Example 4 according to the present disclosure;

FIG. 4 is a diagram illustrating an X-ray structure of a palladium complex catalyst in Preparation Example 6 according to the present disclosure;

FIG. 5 is a diagram illustrating an X-ray structure of a palladium complex catalyst in Preparation Example 7 according to the present disclosure;

FIG. 6 is a diagram illustrating an X-ray structure of a palladium complex catalyst in Preparation Example 8 according to the present disclosure;

FIG. 7 shows graphs of the conversion rate of norbornene polymerization reaction in Example 1-1 using a cobalt complex catalyst in Preparation Example 1 according to the present disclosure; and FIG. 8 shows graphs of the conversion rate of norbornene polymerization reaction in Example 1-5 using a palladium complex catalyst in Preparation Example 5 according to the present disclosure.

DESCRIPTION OF THE PREFERRED EMBODIMENTS

Unless otherwise defined, all technical and scientific terms used herein have the same meaning as commonly understood by one of ordinary skill in the art to which this invention belongs. In general, the nomenclature used herein is well-known and commonly used in the art. Unless the context clearly indicates otherwise, it will be further understood that the terms “comprises”, “comprising,”, “includes”, and/or “including”, when used herein, specify the presence of stated features, integers, steps, operations, elements, and/or components, but do not preclude the presence or addition of one or more other features, integers, steps, operations, elements, components, and/or groups thereof.

In one aspect, the present disclosure relates to a complex catalyst containing an imine-based ligand for polymerizing a cyclic olefin-based monomer, the catalyst including at least one among compounds represented by Formulas 1 to 3 below.

[Formula 1]

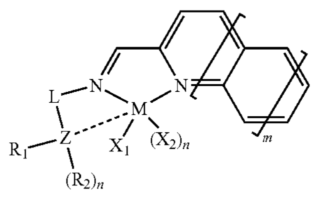

[Formula 2]

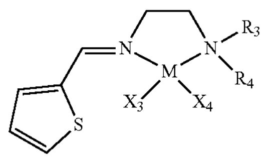

[Formula 3]

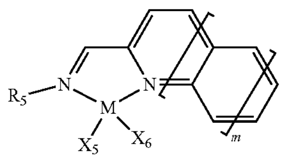

In Formulas 1 to 3, M is palladium or cobalt, $R_1$ to $R_5$ are the same or different and are each independently selected from the group consisting of a hydrogen atom, a substituted or unsubstituted alkyl group, a substituted or unsubstituted cycloalkyl group, and a substituted or unsubstituted aryl group, $X_1$ to $X_6$ are the same or different and are each independently a halogen group, L is $-(CH_2)_y-$ (where y is an integer in a range of 1 to 5), Z is the same or different and are each independently selected from the group consisting of an oxygen atom, a nitrogen atom, a carbon atom, and $-(CH_2)-$, n is an integer of 0 or 1, m is an integer in a range of 0 to 3, and each dotted line indicates the presence or absence of a bond.

In $R_1$ to $R_5$ of Formulas 1 to 3, the substituted or unsubstituted alkyl group may mean a substituted or unsubstituted methyl group, a substituted or unsubstituted ethyl group, a substituted or unsubstituted butyl group, and the like. The substituted or unsubstituted alkyl group may be an alkyl group having 1 or more carbon atoms, preferably having 1 to 10 carbon atoms, and more preferably having 1 to 5 carbon atoms.

In addition, in $R_1$ to $R_5$ of Formulas 1 to 3, the substituted or unsubstituted cycloalkyl group may be a substituent including a substituted or unsubstituted cyclopentyl group, a substituted or unsubstituted cyclohexyl group, a substituted or unsubstituted cycloheptyl group, and the like. The substituted or unsubstituted cycloalkyl group may have 3 or more carbon atoms and preferably have 3 to 10 carbon atoms.

Furthermore, in $R_1$ to $R_5$ of Formulas 1 to 3, the substituted or unsubstituted aryl group, which is an organic radical derived from an aromatic hydrocarbon by removing one hydrogen, is an aryl group having 6 to 20 carbon atoms. Examples thereof may include aromatic groups, such as a phenyl group, o-biphenyl group, m-biphenyl group, p-biphenyl group, o-terphenyl group, m-terphenyl group, p-terphenyl group, a naphthyl group, an anthryl group, a phenanthryl group, a pyrenyl group, an indenyl group, a fluorenyl group, a tetrahydronaphthyl group, a perylenyl group, a chrysenyl group, a naphthacenyl group, a fluoranthenyl group, and the like. At least one hydrogen atom in the aryl group may be substituted with a deuterium atom, a halogen atom, a hydroxy group, a nitro group, a cyano group, a silyl group, an amino group, a carboxyl group, a sulfonic acid group, a phosphate group, an alkyl group having 1 to 10 carbon atoms, and the like.

In the present disclosure, the term "substituted" in "substituted or unsubstituted" means that a component is substituted with at least one substituent selected from the group consisting of an alkyl group having 1 to 10 carbon atoms, an alkenyl group having 2 to 24 carbon atoms, an alkynyl group having 2 to 24 carbon atoms, a heteroalkyl group having 1 to 24 carbon atoms, an aryl group having 6 to 24 carbon atoms, and an arylalkyl group having 7 to 24 carbon atoms.

In addition, considering the ranges of the alkyl group or aryl group in terms of the "alkyl group having 1 to 10 carbon atoms", the "aryl group having 6 to 24 carbon atoms", and the like in the present disclosure, ranges of carbon number in the alkyl group having 1 to 10 carbon atoms and the aryl group having 6 to 24 carbon atoms means the total number of carbon atoms constituting an alkyl portion or an aryl portion, respectively. In this case, the substituent is regarded as unsubstituted without consideration of the substituted portion.

On the other hand, in $X_1$ and $X_6$ of Formulas 1 to 3, the halogen group may be at least one selected from the group consisting of a chlorine atom (Cl), a bromine atom (Br), and an iodine atom (I), and is preferably a chlorine atom (Cl) or a bromine atom (Br). In Formulas 1 and 2, m is an integer in a range of 0 to 3, and is preferably an integer in a range of 0 to 2.

Specifically, in Formulas 1 to 3, when M is cobalt, $R_1$ to $R_4$ may be the same or different and may be each independently selected from the group consisting of a hydrogen atom and a substituted or unsubstituted alkyl group having 1 to 5 carbon atoms, $X_1$ to $X_4$ may be a chlorine atom, L may be $-(CH_2)_y-$ (where y is an integer in a range of 1 to 5), Z may be the same or different and are each independently selected from the group consisting of an oxygen atom, a nitrogen atom, and $-(CH_2)_y-$, n may be an integer of 0 or 1, m may be an integer of 0 to 3, and each dotted line may indicate the presence or absence of a bond.

More specifically, a cobalt complex catalyst for polymerizing the cyclic olefin-based monomer, according to one embodiment of the present disclosure, may be a complex catalyst in which an iminopyridine ligand and a cobalt halide are bonded and a complex catalyst in which an iminoquinolyl ligand and a cobalt halide are bonded, which may include at least one among compounds represented by Formulas 1A to 1C and 2A.

[Formula 1A]

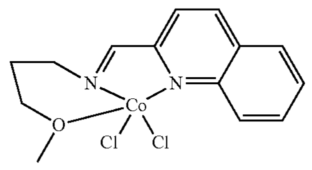

[Formula 1B]

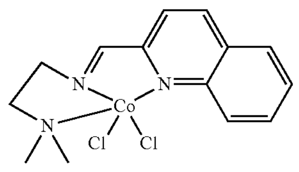

-continued

[Formula 1C]

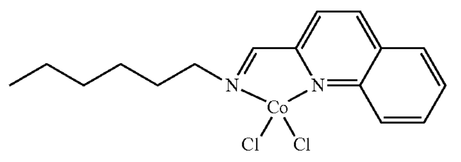

[Formula 2A]

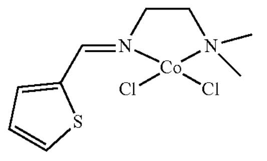

In addition, in Formulas 1 to 3, when M is palladium, $R_1$ to $R_5$ may be the same or different and may be each independently selected from the group consisting of a hydrogen atom, a substituted or unsubstituted alkyl group having 1 to 5 carbon atoms, a substituted or unsubstituted cycloalkyl group having 3 to 10 carbon atoms, and a substituted or unsubstituted aryl group having 6 to 20 carbon atoms, $X_1$ to $X_6$ may be a chlorine atom (Cl), L may be $—(CH_2)_y—$ (where y is an integer in a range of 1 to 5), Z may be the same or different and may be each independently selected from the group consisting of an oxygen atom, a nitrogen atom, and $—(CH_2)—$, n may be an integer of 0 or 1, m may be an integer in a range of 0 to 3, and each dotted line may indicate the presence or absence of a bond.

More specifically, a palladium complex catalyst for polymerizing the cyclic olefin-based monomer, according to one embodiment of the present disclosure, may be a complex catalyst in which an iminopyridine ligand and a palladium halide are bonded and a complex catalyst in which an iminoquinolyl ligand and a palladium halide are bonded, which may include at least one among compounds represented by Formulas 1D to 1G, 2B, 3A, and 3B.

[Formula 1D]

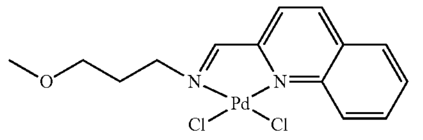

[Formula 1E]

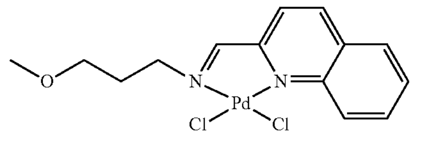

[Formula 1F]

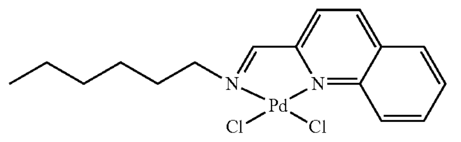

[Formula 1G]

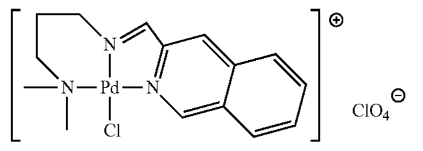

-continued

[Formula 2B]

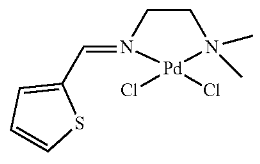

[Formula 3A]

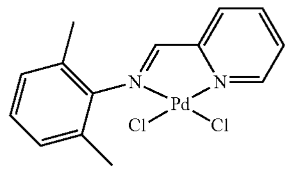

[Formula 3B]

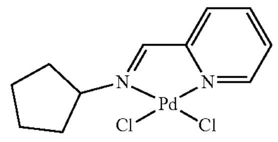

The complex catalyst represented by Formula 1 may be prepared by reacting an imine-based derivative ligand represented by Formula 4 below with a cobalt halide precursor or a palladium halide precursor. In this case, the reaction between the imine-based derivative ligand and the cobalt halide precursor or the palladium halide precursor may be performed at room temperature and is preferably performed at a temperature in a range of 10° C. to 30° C.

In addition, the reaction time may be in a range of 10 hours to 48 hours.

[Formula 4]

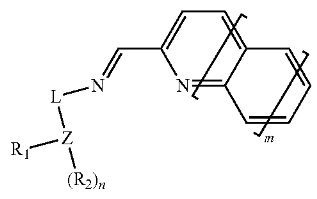

In Formula 4, $R_1$, $R_2$, Z, L, n, and m are practically the same as $R_1$, $R_2$, Z, L, n, and m described with reference to Formula 1, so redundant detailed descriptions are omitted.

Specifically, the compound represented by Formula 4 may be, for example, a compound represented by one of Formulas 4A to 4F below.

[Formula 4A]

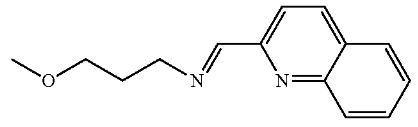

[Formula 4B]

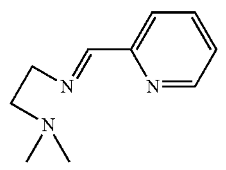

-continued

[Formula 4C]

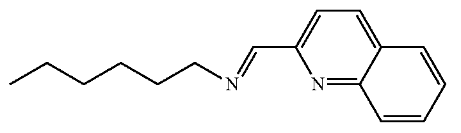

[Formula 4D]

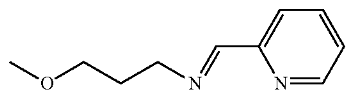

[Formula 4E]

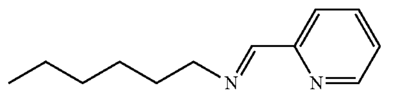

[Formula 4F]

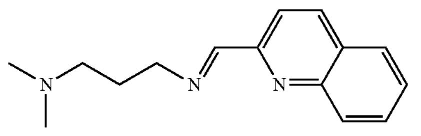

In addition, the complex catalyst represented by Formula 2 may be prepared by reacting an imine-based derivative ligand represented by Formula 5 below with a cobalt halide precursor or a palladium halide precursor. In this case, the reaction between the imine-based derivative ligand and the cobalt halide precursor or the palladium halide precursor may be performed at room temperature and is preferably performed at a temperature in a range of 10° C. to 30° C. In addition, the reaction time may be in a range of 10 hours to 48 hours.

[Formula 5]

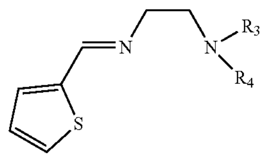

In Formula 5, $R_3$ and $R_4$ are practically the same as $R_3$ and $R_4$ described with reference to Formula 2, so redundant detailed descriptions are omitted.

Specifically, the compound represented by Formula 5 may be, for example, a compound represented by Formula 5A below.

[Formula 5A]

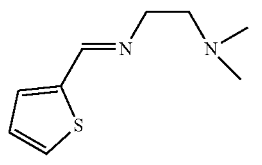

In addition, the complex catalyst represented by Formula 3 may be prepared by reacting an imine-based derivative ligand represented by Formula 6 below with a cobalt halide precursor or a palladium halide precursor. In this case, the reaction between the imine-based derivative ligand and the cobalt halide precursor or the palladium halide precursor may be performed at room temperature and is preferably performed at a temperature in a range of 10° C. to 30° C. In addition, the reaction time may be in a range of 10 hours to 48 hours.

[Formula 6]

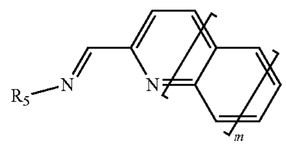

In Formula 6, $R_5$ and m are practically the same as $R_5$ and m described with reference to Formula 3, so redundant detailed descriptions are omitted.

Specifically, the compound represented by Formula 6 may be, for example, a compound represented by Formula 6A or 6B below.

[Formula 6A]

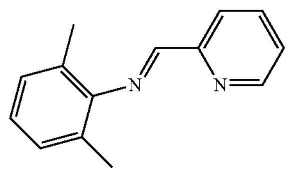

[Formula 6B]

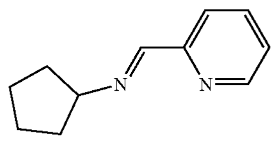

On the other hand, the cobalt halide precursor may be cobalt chloride, cobalt bromide, cobalt iodide, and the like, is preferably cobalt chloride and cobalt bromide, and is more preferably cobalt (II) chloride hexahydrate.

In addition, the palladium halide precursor may be palladium chloride, palladium bromide, palladium iodide, and the like, is preferably palladium chloride and palladium bromide, and is more preferably palladium chloride.

Such a catalyst preparation method may prepare a catalyst with good stability in the air at a low cost and high yield.

From another aspect, the present disclosure relates to a method of preparing a cyclic olefin-based polymer. The method includes performing addition polymerization of a cyclic olefin-based monomer in the presence of the complex catalyst containing the imine-based ligand for polymerizing the cyclic olefin-based monomer described above.

As the cyclic olefin-based monomer, any cyclic olefin monomer capable of forming a cyclic olefin-based polymer may be used. As examples of such a cyclic olefin monomer in the present disclosure, at least one selected from among norbornene (Nb) and its derivatives, dicyclopentadiene (DCPD) and its derivatives, cyclopentadiene (CPD) and its derivatives, cyclopentene (Cp) and its derivatives, cyclobutene (Cb) and its derivatives, cyclohexene (Chx) and its derivatives, cycloheptene (Chp) and its derivatives, and cyclooctene (Cot) and its derivatives may be used. Preferably, the cyclic olefin-based monomer is a compound represented by Formula 7 below.

[Formula 7]

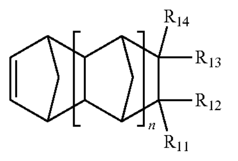

In Formula 7, n may be an integer in a range of 0 to 4, and $R_{11}$ to $R_{14}$ may be the same or different and may be each independently selected from the group consisting of a hydrogen atom, a halogen atom, a hydroxy group, a carboxyl group, a straight-chain or branched-chain alkyl group having 1 to 20 carbon atoms, a cycloalkyl group having 3 to 12 carbon atoms, an aryl group having 6 to 20 carbon atoms, an alkoxy group having 1 to 10 carbon atoms, and an acyl group having 1 to 10 carbon atoms.

In Formula 7, n is an integer in a range of 0 to 2, and $R_{11}$ to $R_{14}$ are the same or different and are each independently selected from the group consisting of a hydrogen atom, a carboxyl group, a straight-chain or branched-chain alkyl group having 1 to 5 carbon atoms, a cycloalkyl group having 3 to 12 carbon atoms, an aryl group having 6 to 18 carbon atoms, an alkoxy group having 1 to 5 carbon atoms, and it is preferably selected from the group consisting of an acyl group having 1 to 6 carbon atoms, which is preferable in terms of polymerization.

In the present disclosure, the cyclic olefin-based monomer described above may be homopolymerized, two or more cyclic olefin-based monomers may be copolymerized, or the cyclic olefin-based monomer and an olefin-based monomer may be copolymerized. In this case, any olefin-based monomer capable of undergoing addition polymerization with the cyclic olefin-based monomer may be used without limitation. In terms of the physical properties of the prepared polymer, the olefin-based monomer may be a monomer containing a polar vinyl group, such as vinyl acetate, acrylate, alkyl methacrylate, methyl methacrylate, and the like.

In the case of polymerizing the cyclic olefin-based monomer using the catalyst for polymerizing the cyclic olefin-based monomer of the present disclosure, the polymerization may be performed in a slurry phase, a liquid phase, or a gas phase. When performing addition polymerization in the liquid or slurry phase, a solvent or olefin itself may be used as a medium. The solvent used herein may include at least one solvent selected from the group consisting of 1,2-dichlorobenzene, toluene, n-pentane, n-hexane, n-heptane, chlorobenzene, dichloromethane, chloroform, 1,2-dichloroethane, and 1,1,2,2-tetrachloroethane.

In addition, the polymerization may be performed in a batch, semi-continuous, or continuous manner, and the reaction may be performed under the condition of a temperature in a range of 30° C. to 150° C. for 1 to 26 hours. When performing the reaction at a temperature of 30° C. or for less than 1 hour, there may be a problem in that the polymerization insufficiently proceeds. On the contrary, when performing the reaction at a temperature of 150° C. or for over 26 hours, the polymer chain may be decomposed, thereby decreasing molecular weight or causing gelation.

On the other hand, in the present disclosure, a cocatalyst may be additionally used for catalytic activity. The cocatalyst used for the polymerization may include at least one selected from the group consisting of modified methylaluminoxane (MMAO), trimethyl aluminum (TMA), triethylaluminum (TEA), triisobutylaluminum (TIBAL), dimethyl chloro aluminum (DMCA), and diethyl chloro aluminum (DECA). In terms of catalytic activity, the cocatalyst is preferably modified methylaluminoxane (MMAO).

As the modified methylaluminoxane, well-known compounds widely used in the related art of catalytically polymerizing cyclic olefin-based (co)polymers may be used. In the present disclosure, well-known modified methylaluminoxane being currently available was also used.

Hereinafter, the present disclosure will be specifically described according to examples, but the present disclosure is not limited by the following examples.

Preparation Example 1: Preparation of Cobalt Complex C1

1-1: Preparation of ligand L1

First, 2-quinolinecarboxaldehyde (0.600 g, 3.8 mmol) dissolved in $CH_2Cl_2$ (10.0 ml), and a solution in which 3-methoxypropylamine (0.338 g, 3.8 mmol) dissolved in $CH_2Cl_2$ (10.0 ml) was mixed therewith. The resulting mixture was refluxed at a temperature of 40° C. and reacted with stirring for 48 hours. After completion of the reaction, $MgSO_4$ was added to the reaction product, filtered through filter paper, and concentrated under reduced pressure to obtain ligand L1 (0.7973 g, 81%), a dark red oil represented by Formula 4A.

$^1$H NMR ($CDCl_3$, 500 MHz): δ 8.55 (s, 1H, —$CH_2$—CH═N—C—) 8.15 (t, 1H, J=8.34 Hz, —CH—CH═C—), 8.13 (t, 1H, J=10.72 Hz, —CH—CH═C—), 8.11 (d, 1H, J=8.58 Hz, —CH—CH═C—), 7.81 (d, 1H, J=8.34 Hz, —CH—CH═CH—), 7.71 (t, 1H, J=7.64 Hz, —CH—CH═CH—), 7.54 (t, 1H, J=7.52 Hz, —CH—CH═CH—), 3.76 (t, 2H, J=7.01 Hz, —O—$CH_2$—$CH_2$—), 2.41 (t, 2H, J=7.98 Hz, —$CH_2$—$CH_2$—N═), 2.26 (s, 3H, —O—$CH_3$), 1.94 (m, 2H, J=7.27 Hz, —$CH_2$—$CH_2$—$CH_2$—).

IR (liquid neat; $cm^{-1}$): 2914 (m), 2764 (m), 1643 (s), 1596 (m), 1560 (m), 1500 (m), 1460 (s), 1430 (s), 1368 (s), 1310 (m), 1149 (m), 1037 (m), 960 (m), 890 (m), 832 (s), 750 (s), 618 (m).

1-2: Preparation of Cobalt Complex C1

Ligand L1 (0.228 g, 1.00 mmol) obtained in Preparation Example 1-1 dissolved in anhydrous ethanol (10.0 ml), added to $CoCl_2·6H_2O$ (0.238 g, 1.00 mmol) dissolving in anhydrous ethanol (10.0 ml), and reacted with stirring at room temperature for 24 hours. After completion of the reaction, the resulting green solid powder was filtered, washed twice with cold ethanol (20.0 ml), and washed three times with diethyl ether (20.0 ml). After washing, the resulting product was dried in a vacuum oven to prepare cobalt complex C1 (0.258 g, 72%) represented by Formula 1A. The structure of cobalt complex C1 prepared is shown in FIG. 1.

Analysis calculated for $C_{14}H_{16}C_{12}CoN_2O$: C, 46.95%; H, 4.50%; N, 7.82%.

Found: C, 47.18%; H, 4.52%; N, 7.92%.

IR (solid neat; $cm^{-1}$): 2941 (w), 1641 (m), 1505 (m), 1435 (m), 1381 (m), 1333 (m), 1072 (s), 1042 (s), 964 (s), 905 (m), 841 (s), 807 (s), 787 (s), 749 (s)

Preparation Example 2: Preparation of Cobalt Complex C2

2-1: Preparation of Ligand L2

Ligand L2 was prepared by the following method with reference to J. Lee, H. Lee, S. Nayab, and K. B. Yoon, *Polyhedron,* 2019, 158, 432-440.

First, 2-pyridinecarboxaldehyde (0.407 g, 3.8 mmol) dissolved in $CH_2Cl_2$ (50.0 ml), and a solution in which N,N- dimethylethylenediamine (0.335 g, 3.8 mmol) dissolved in $CH_2Cl_2$ (50.0 ml) was mixed therewith. The resulting mixture reacted with stirring at room temperature for 24 hours. After completion of the reaction, $MgSO_4$ was added to the reaction product, filtered through filter paper, and concentrated under reduced pressure to obtain ligand L2 (0.538 g, 80%), an orange oil represented by Formula 4B.

$^1$H NMR ($CDCl_3$, 500 MHz): δ 8.56 (d, 1H, J=5.59 Hz —CH—CH═N—) 8.35 (s, 1H, $CH_2$—CH═N—C—), 7.91 (d, 1H, J=7.46 Hz —CH—CH═C—), 7.65 (t, 1H, J=7.46 Hz —CH—CH═CH—), 7.23 (t, 1H, J=5.59 Hz, —CH—CH═CH—), 3.73 (t, 2H, J=7.49 Hz, —N—$CH_2$—$CH_2$—N═), 2.60 (t, 2H, J=6.74 Hz, —N—$CH_2$—$CH_2$—N═), 2.24 (s, 6H, —N—$(CH_3)_2$).

IR (liquid neat; $cm^{-1}$): 2941 (m), 2855 (m), 2918 (m), 2768 (s), 1648 (s), 1587 (m), 1567 (m), 1463 (s), 1438 (s), 1354 (w), 1338 (w), 1291 (w), 1269 (w), 1236 (w), 1182 (w), 1152 (w), 989 (m), 931 (w), 855 (m), 773 (s), 743 (s), 661 (w), 616 (m).

2-2: Preparation of Cobalt Complex C2

Ligand L2 (0.886 g, 5.00 mmol) obtained in Preparation Example 2-1 dissolved in anhydrous ethanol (10.0 ml), added to $CoCl_2.6H_2O$ (1.19 g, 1.00 mmol) dissolving in anhydrous ethanol (10.0 ml), and reacted with stirring at room temperature for 12 hours. After completion of the reaction, the resulting green solid powder was filtered, washed twice with cold ethanol (20.0 ml), and washed three times with diethyl ether (20.0 ml). After washing, the resulting product was dried in a vacuum oven to prepare cobalt complex C2 (1.20 g, 78.2%) represented by Formula 1B. The structure of cobalt complex C2 prepared is shown in FIG. 2.

Analysis calculated for $C_{10}H_{15}C_{12}$ $CoN_3$: C, 39.1%; H, 4.92%; N, 13.7%.

Found: C, 39.3%; H, 4.93%; N, 13.6%.

IR (solid neat; $cm^{-1}$): 3551 (w), 2865 (w), 2837 (w), 2791 (w), 1642 (m), 1590 (m), 1441 (m), 1366 (w), 1336 (w), 1297 (m), 1262 (w), 1211 (m), 1155 (w), 1098 (w), 1066 (s), 1034 (m), 946 (m), 894 (m), 858 (w), 777 (s), 634 (m).

Preparation Example 3: Preparation of Cobalt Complex C3

3-1: Preparation of ligand L3

First, 2-quinolinecarboxaldehyde (0.600 g, 3.8 mmol) dissolved in $CH_2Cl_2$ (10.0 ml), and a solution in which hexylamine (0.384 g, 3.8 mmol) dissolved in $CH_2Cl_2$ (50.0 ml) was mixed therewith. The resulting mixture was refluxed in a solvent at a temperature of 40° C. while reacting with stirring for 48 hours. After completion of the reaction, $MgSO_4$ was added to the reaction product, filtered through filter paper, and concentrated under reduced pressure to obtain ligand L3 (0.684 g, 75%), a dark red oil represented by Formula 4C.

$^1$H NMR ($CDCl_3$, 500 MHz): δ 8.54 (s, 1H, —CH—CH═C—) 8.14 (s, 2H, —CH—CH═C—), 8.13 (s, 1H, —$CH_2$—CH═N—C—), 7.78 (s, 1H, —CH—CH═C—), 7.70 (t, 1H, J=8.11 Hz, —CH—CH═CH—), 7.52 (t, 1H, J=7.94 Hz, —CH—CH═CH—) 3.72 (t, 2H, J=7.26 Hz, ═N—$CH_2$—$CH_2$—), 1.75 (m, 2H, J=7.60 Hz, —$CH_2$—$CH_2$—$CH_2$—N═), 1.39 (m, 2H, J=7.16 Hz, —$CH_2$—$CH_2$—$CH_2$—$CH_3$), 1.32 (m, 4H, J=4.16 Hz, —$CH_2$—$CH_2$—$CH_2$—$CH_3$), 1.32 (t, 3H, J=6.97 Hz, —$CH_2$—$CH_2$—$CH_3$).

IR (liquid neat; $cm^{-1}$): 2926 (s), 2856 (s), 1645 (m), 1596 (m), 1561 (m), 1502 (m), 1460 (m), 1431 (m), 1371 (m), 1313 (m), 1142 (w), 1114 (w), 1017 (w), 957 (w), 893 (w), 832 (s), 749 (s), 619 (m), 3-2: Preparation of Cobalt Complex C3

Ligand L3 (0.240 g, 1.00 mmol) obtained in Preparation Example 3-1 dissolved in anhydrous ethanol (10.0 ml), added to $CoCl_2.6H_2O$ (0.238 g, 1.00 mmol) dissolving in anhydrous ethanol (10.0 ml), and reacted with stirring at room temperature for 24 hours. After completion of the reaction, the resulting green solid powder was filtered, washed twice with cold ethanol (20.0 ml), and washed three times with diethyl ether (20.0 ml). After washing, the resulting product was dried in a vacuum oven to prepare cobalt complex C3 (0.278 g, 75%) represented by Formula 1C.

IR (solid neat; $cm^{-1}$): 2952 (w), 2923 (w), 2854 (w), 1638 (w), 1508 (w), 1461 (w), 1434 (w), 1380 (w), 1346 (w), 1303 (w), 1208 (w), 1124 (w), 1043 (w), 1019 (w), 984 (w), 883 (w), 839(s), 784 (s), 752 (s), 724 (w).

Preparation Example 4: Preparation of Cobalt Complex C4

4-1: Preparation of Ligand L4

Ligand L4 was prepared by the following method with reference to C. Anderson, M. Crespo, M. Font-Bardia, A. Klein, and X. Solans, *Journal of Organometallic Chemistry,* 601 (2000) 22-33.

First, 2-thiophenecarboxaldehyde (2.24 g, 20.0 mmol) dissolved in $CH_2Cl_2$ (50.0 ml), and a solution in which N,N-dimethylethylenediamine (1.76 g, 20.0 mmol) dissolved in $CH_2Cl_2$ (50.0 ml) was mixed therewith. The resulting mixture reacted with stirring at room temperature for 72 hours. After completion of the reaction, $MgSO_4$ was added to the reaction product, filtered through filter paper, and concentrated under reduced pressure to obtain ligand L4 (3.12 g, 78%), a yellow oil represented by Formula 5A.

4-2: Preparation of Cobalt Complex C4

Ligand L4 (0.364 g, 2.00 mmol) obtained in Preparation Example 4-1 dissolved in anhydrous ethanol (10.0 ml), added to $CoCl_2.6H_2O$ (0.476 g, 2.00 mmol) dissolving in anhydrous ethanol (10.0 ml), and reacted with stirring at room temperature for 24 hours. After completion of the reaction, the resulting green solid powder was filtered, washed twice with cold ethanol (20.0 ml), and washed three times with diethyl ether (20.0 ml). After washing, the resulting product was dried in a vacuum oven to prepare cobalt complex C4 (0.459 g, 75%) represented by Formula 2A. The structure of cobalt complex C4 prepared is shown in FIG. 3.

Analysis calculated for $C_9H_{14}C_{12}NC_2S$: C, 34.63%; H, 4.52%; N, 8.98%; S, 10.27%

Found: C, 34.72%; H, 4.53%; N, 8.89%; S, 10.45%

IR (solid neat; $cm^{-1}$): 2978 (m), 2902 (m), 1616 (s), 1454 (s), 1423 (s), 1391 (s), 1338 (s), 1255 (m), 1219 (m), 1053 (s), 1011 (s), 729 (s).

Preparation Example 5: Preparation of Palladium Complex C5

5-1: Preparation of Ligand L5

Ligand L5 was prepared by following the method with reference to D. Kim, Y. Song, S. Kim, H. J. Lee, and H. Lee. *Journal of Coordination Chemistry,* 67 (2014) 13, 2312-2329.

First, 3-methoxypropylamine (1.78 g, 20.0 mmol) dissolved in $CH_2Cl_2$ (50.0 ml), and a solution in which 2-pyridinecarboxaldehyde (2.214 g, 20.00 mmol) dissolved in $CH_2Cl_2$ (50.0 ml) was mixed therewith. The resulting mixture reacted with stirring at room temperature for 72 hours. After completion of the reaction, $MgSO_4$ was added to the reaction product, filtered through filter paper, and concentrated under reduced pressure to obtain ligand L5 (3.315 g, 83%), a yellow oily liquid represented by Formula 4D.

$^1$H NMR ($CDCl_3$, 500 MHz): δ 8.56 (s, 1H, —$CH_2$—CH═N—C—), 8.13 (d, 1H, J=4.81 Hz, —N═CH═CH═), 7.78 (d, 1H, J=7.78 Hz, —C—CH═CH—), 7.70 (t, 1H, J=7.71 Hz, —CH—CH═CH—), 7.52 (t, 1H, J=4.81 Hz, —CH—CH═CH—), 3.80 (t, 2H, J=7.14 Hz, ═N—$CH_2$—$CH_2$—), 3.67 (t, 2H, J=6.40 Hz, —$CH_2$—$CH_2$—$CH_2$—O—), 3.34 (s, 3H, —O—$CH_3$), 2.03 (m, 2H, J=6.18 Hz, —$CH_2$—$CH_2$—$CH_2$—O—).

5-2: Preparation of Palladium Complex C5

Palladium complex C5 was prepared by the following method with reference to D. Kim, Y. Song, S. Kim, H. J. Lee, and H. Lee, *Journal of Coordination Chemistry,* 67 (2014) 13, 2312-2329.

Ligand L5 (0.228 g, 1.00 mmol) obtained in Preparation Example 5-1 dissolved in anhydrous ethanol (10.0 ml), added to $Pd(MeCN)_2Cl_2$ (0.259 g, 1.00 mmol) dissolving in anhydrous ethanol (10.0 ml), and reacted with stirring at room temperature for 24 hours. After completion of the reaction, the resulting yellow solid powder was filtered, washed twice with cold ethanol (20.0 ml), and washed three times with diethyl ether (20.0 ml). After washing, the resulting product was dried in a vacuum oven to prepare palladium complex C5 (0.252 g, 71%) represented by Formula 1D.

$^1$H NMR (DMSO, 500 MHz): δ 8.96 (s, 1H, —$CH_2$—CH═N—C—), 8.59 (d, 1H, J=4.81 Hz, —N═CH—CH═), 8.35 (d, 1H, J=7.78 Hz, —C—CH═CH—), 8.12 (t, 1H, J=7.71 Hz, —CH—CH═CH—), 7.87 (t, 1H, J=4.81 Hz, —CH—CH═CH—), 3.77 (t, 2H, J=7.14 Hz, ═N—$CH_2$—$CH_2$—), 3.39 (t, 2H, J=6.40 Hz, —$CH_2$—$CH_2$—$CH_2$—O—), 3.32 (s, 3H, —O—$CH_2$), 2.02 (m, 2H, J=6.18 Hz, —$CH_2$—$CH_2$—$CH_2$—O—).

Preparation Example 6: Preparation of Palladium Complex C6

6-1: Preparation of Ligand L6

First, 2-quinolinecarboxaldehyde (0.600 g, 3.8 mmol) dissolved in $CH_2Cl_2$ (10.0 ml), and a solution in which 3-methoxypropylamine (0.338 g, 3.8 mmol) dissolved in $CH_2Cl_2$ (10.0 ml) was mixed therewith. The resulting mixture was refluxed at a temperature of 40° C. and reacted with stirring for 48 hours. After completion of the reaction, $MgSO_4$ was added to the reaction product, filtered through filter paper, and concentrated under reduced pressure to obtain ligand L6 (0.7973 g, 81%), a dark red oil represented by Formula 4A.

$^1$H NMR ($CDCl_2$, 500 MHz): δ 8.55 (s, 1H, —$CH_2$—CH═N—C—) 8.15 (t, 1H, J=8.34 Hz, —CH—CH═C—), 8.13 (t, 1H, J=10.72 Hz, —CH—CH═C—), 8.11 (d, 1H, J=8.58 Hz, —CH—CH═C—), 7.81 (d, 1H, J=8.34 Hz, —CH—CH═CH—), 7.71 (t, 1H, J=7.64 Hz, —CH—CH═CH—), 7.54 (t, 1H, J=7.52 Hz, —CH—CH═CH—), 3.76 (t, 2H, J=7.01 Hz, —O—$CH_2$—$CH_2$—), 2.41 (t, 2H, J=7.98 Hz, —$CH_2$—$CH_2$—N═), 2.26 (s, 3H, —O—$CH_3$), 1.94 (m, 2H, J=7.27 Hz, —$CH_2$—$CH_2$—$CH_2$—).

IR (liquid neat; $cm^{-1}$): 2914 (m), 2764 (m), 1643 (s), 1596 (m), 1560 (m), 1500 (m), 1460 (s), 1430 (s), 1368 (s), 1310 (m), 1149 (m), 1037 (m), 960 (m), 890 (m), 832 (s), 750 (s), 618 (m).

6-2: Preparation of Palladium Complex C6

Ligand L6 (0.228 g, 1.00 mmol) obtained in Preparation Example 6-1 dissolved in anhydrous ethanol (10.0 ml), added to $Pd(MeCN)_2Cl_2$ (0.259 g, 1.00 mmol) dissolving in anhydrous ethanol (10.0 ml), and reacted with stirring at room temperature for 24 hours. After completion of the reaction, the resulting yellow solid powder was filtered, washed twice with cold ethanol (20.0 ml), and washed three times with diethyl ether (20.0 ml). After washing, the resulting product was dried in a vacuum oven to prepare palladium complex C6 (0.288 g, 71%) represented by Formula 1E. The structure of palladium complex C6 prepared is shown in FIG. 4.

$^1$H NMR ($CDCl_3$, 500 MHz): δ 9.73 (d, 1H, J=9.25 Hz, —CH—CH═C—), 8.47 (d, 1H, J=8.50 Hz, —CH—CH═C—, 8.39 (s, 1H, —$CH_2$—CH═N—C—) 7.89 (t, 1H, J=7.56 Hz, —CH—CH═CH—), 7.84 (d, 1H, J=8.80 Hz, —CH—CH═C—), 7.81 (d, 1H, J=8.08 Hz, —CH—CH═C—), 7.74 (t, 1H, J=7.56 Hz, —CH—CH═CH—), 4.04 (t, 2H, J=6.85 Hz, —O—$CH_2$—$CH_2$—), 3.43 (t, 2H, J=5.88 Hz, —$CH_2$—$CH_2$—N═), 3.29 (s, 3H, —O—$CH_3$), 2.21 (m, 2H, J=5.47 Hz, —$CH_2$—$CH_2$—$CH_2$—).

IR (solid neat; $cm^{-1}$): 2870 (w), 2833 (w), 1685 (m), 1588 (m), 1512 (m), 1460 (m), 1434 (m), 1348 (m), 1300 (m), 1213 (m), 1150 (m), 1112 (s), 1080 (m), 1033 (m), 938 (s), 908 (m), 876 (s), 781 (s), 861 (s).

Preparation Example 7: Preparation of Palladium Complex C7

7-1: Preparation of Ligand L7

First, hexylamine (2.024 g, 20.00 mmol) dissolved in $CH_2Cl_2$ (50.0 ml), and a solution in which 2-pyridinecarboxaldehyde (2.214 g, 20.00 mmol) dissolved in $CH_2Cl_2$ (50.0 ml) was mixed therewith. The resulting mixture reacted with stirring at room temperature for 72 hours. After completion of the reaction, $MgSO_4$ was added to the reaction product, filtered through filter paper, and concentrated under reduced pressure to obtain ligand L7 (2.921 g, 83%), a colorless oil represented by Formula 4E.

$^1$H NMR ($CDCl_3$, 500 MHz): δ 8.63 (d, 1H, J=4.81 Hz, —N═CH—CH═), 8.38 (s, 1H, —$CH_2$—CH═N—C—), 7.98 (d, 1H, J=7.78 Hz, —C—CH═CH—), 7.72 (t, 1H, J=7.71 Hz, —CH—CH═CH—), 7.29 (t, 1H, J=4.81 Hz, —CH—CH═CH—), 3.67 (t, 2H, J=7.34 Hz, ═N—$CH_2$—$CH_2$—), 3.67 (m, 2H, J=7.46 Hz, ═N—$CH_2$—$CH_2$—$CH_2$—) 1.35 (m, 6H, —$CH_2$—$CH_2$—$CH_2$—$CH_2$—$CH_2$—) 0.88 (t, 3H, —$CH_2$—$CH_3$).

IR (liquid neat; $cm^{-1}$): 2926 (s), 2856 (s), 1648 (m), 1587 (m), 1464 (s), 1436 (m), 1044 (m), 991 (m), 771 (s), 741 (m), 615 (m).

7-2: Preparation of Palladium Complex C7

Ligand L7 (0.352 g, 2.00 mmol) obtained in Preparation Example 7-1 dissolved in anhydrous ethanol (10.0 ml), added to $Pd(MeCN)_2Cl_2$ (0.259 g, 1.00 mmol) dissolving in anhydrous ethanol (10.0 ml), and reacted with stirring at room temperature for 24 hours. After completion of the reaction, the resulting yellow solid powder was filtered, washed twice with cold ethanol (20.0 ml), and washed three times with diethyl ether (20.0 ml). After washing, the resulting product was dried in a vacuum oven to prepare palladium complex C7 (0.626 g, 85%) represented by Formula 1F. The structure of palladium complex C7 prepared is shown in FIG. 5.

$^1$H NMR (DMSO, 500 MHz): δ 8.96 (d, 1H, J=5.32 Hz, —N═CH—CH═), 8.61 (s, 1H, —$CH_2$—CH═N—C—), 8.34 (t, 1H, J=7.70 Hz, —C—CH═CH—), 8.09 (d, 1H, J=7.61 Hz, —CH—CH═CH—), 7.87 (t, 1H, J=6.61 Hz, —CH—CH═CH—), 3.71 (t, 2H, J=6.83 Hz, =N—$CH_2$—$CH_2$—), 1.77 (m, 2H, ═N—$CH_2$—$CH_2$—$CH_2$—) 1.30 (m, 6H, $CH_2CH_2CH_2CH_2CH_2$) 0.88 (t, 3H, $CH_2CH_3$).

IR (solid neat; $cm^{-1}$): 2933 (s), 2908 (s), 2858 (s), 1597 (m), 1444 (m), 1409 (m), 1376 (m), 1296 (m), 1234 (s), 1107 (m), 1055 (s), 779 (s), 736 (m).

Preparation Example 8: Preparation of Palladium Complex C8

8-1: Preparation of Ligand L8

Ligand L8 was prepared by the following method with reference to S. C. Anderson, M. Crespo, M. Font-Bardia, A. Klein, and X. Solans, *Journal of Organometallic Chemistry,* 601 (2000) 22-33.

First, 2-thiophenecarboxaldehyde (2.24 g, 20.0 mmol) dissolved in $CH_2Cl_2$ (50.0 ml), and a solution in which N,N-dimethylethylenediamine (1.76 g, 20.0 mmol) dissolved in $CH_2Cl_2$ (50.0 ml) was mixed therewith. The resulting mixture reacted with stirring at room temperature for 72 hours. After completion of the reaction, $MgSO_4$ was added to the reaction product, filtered through filter paper, and concentrated under reduced pressure to obtain ligand L8 (3.12 g, 78%), a yellow oil represented by Formula 5A.

8-2: Preparation of Palladium Complex C8

Ligand L8 (0.364 g, 2.00 mmol) obtained in Preparation Example 8-1 dissolved in anhydrous ethanol (10.0 ml), added to $Pd(MeCN)_2Cl_2$ (0.518 g, 2.00 ml) dissolving in anhydrous ethanol (10.0 ml), and reacted with stirring at room temperature for 24 hours. After completion of the reaction, the resulting brown solid powder was filtered, washed twice with cold ethanol (20.0 ml), and washed three times with diethyl ether (20.0 ml). After washing, the resulting product was dried in a vacuum oven to prepare palladium complex C8 (0.583 g, 81%) represented by Formula 2B. The structure of palladium complex C8 prepared is shown in FIG. 6.

$^1$H NMR (DMSO, 500 MHz): δ, ppm: 8.53 (s, 1H, —C—CH═N—), 7.72 (d, 1H, J=5.00 Hz, —S—CH═CH—), 7.53 (d, 1H, J=3.23, —CH═CH—CH═), 7.16 (m, 1H, ═CH—CH═C—), 3.65 (t, 2H, J=6.83 Hz, ═N—$CH_2$—$CH_2$—), 2.54 (t, 2H, J=6.60 Hz —$CH_2$—$CH_2$—N—), 2.23 (s, 6H, —N—$(CH_2)_2$).

Analysis calculated for $C_9H_{14}Cl_2N_2PdS$: C, 30.06%; H, 3.92%; N, 7.79%; S, 8.98%

Found: C, 30.03%; H, 4.03%; N, 7.79%; S, 9.01%.

IR (solid neat; $cm^{-1}$): 2981 (s), 2904 (m), 1615 (s), 1450 (m), 1412 (m), 1239 (m), 1217 (m), 1050 (s), 1000 (m), 856 (m), 763 (s), 732 (m).

Preparation Example 9: Preparation of Palladium Complex C9

9-1: Preparation of Ligand L9

Ligand 9 was prepared by the following method with reference to D. Kim, Y. Song, S. Kim, H. J. Lee, and H. Lee, *Journal of Coordination Chemistry,* 67 (2014) 13, 2312-2329.

First, 3-dimethylamino-1-propylamine (2.05 g, 20.0 mmol) dissolved in $CH_2Cl_2$ (50.0 ml), and a solution in which 2-quinolinecarboxaldehyde (3.14 g, 20.0 mmol) dissolved in $CH_2Cl_2$ (50.0 ml) was mixed therewith. The resulting mixture reacted with stirring at room temperature for 72 hours. After completion of the reaction, $MgSO_4$ was added to the reaction product, filtered through filter paper, and concentrated under reduced pressure to obtain ligand L9 (4.04 g, 78%), a brown oil represented by Formula 4F.

$^1$H NMR ($CDCl_3$, 500 MHz): δ 8.55 (s, 1H, —$CH_2$—CH═N—C—) 8.15 (t, 1H, J=8.34 Hz, —CH—CH═C—), 8.13 (t, 1H, J=10.72 Hz, —CH—CH═C—), 8.11 (d, 1H, J=8.58 Hz, —CH—CH═C—), 7.81 (d, 1H, J=8.34 Hz, —CH—CH═CH—), 7.71 (t, 1H, J=7.64 Hz, —CH—CH═CH—), 7.54 (t, 1H, J=7.52 Hz, —CH—CH═CH—), 3.76 (t, 2H, J=7.01 Hz, —N—$CH_2$—$CH_2$—), 2.41 (t, 2H, J=7.98 Hz, —$CH_2$—$CH_2$—N═), 2.26 (s, 6H, —N—$(CH_3)_2$), 1.94 (m, 2H, J=7.27 Hz, —$CH_2$—$CH_2$—$CH_2$—).

9-2: Preparation of Palladium Complex C9

Palladium complex C9 was prepared by the following method with reference to D. Kim, Y. Song, S. Kim, H. J. Lee, and H. Lee, *Journal of Coordination Chemistry,* 67 (2014) 13, 2312-2329.

Ligand L9 (0.241 g, 1.00 mmol) obtained in Preparation Example 9-1 dissolved in anhydrous ethanol (10.0 ml), added to $Pd(MeCN)_2Cl_2$ (0.259 g, 1.00 mmol) dissolving in anhydrous ethanol (10.0 ml), and then reacted with stirring at room temperature for 24 hours by adding $NaClO_4$ (0.122 g, 1.00 mmol). After completion of the reaction, the resulting yellow solid powder was filtered, washed twice with cold ethanol (20.0 ml), and washed three times with diethyl ether (20.0 ml). After washing, the resulting product was dried in a vacuum oven to prepare palladium complex C9 (0.367 g, 76%) represented by Formula 1G.

$^1$H NMR (DMSO, 500 MHz): δ 9.02 (s, 1H, —$CH_2$—CH═N—C—) 9.01 (d, 1H, J=5.23 Hz, —CH—CH═C—), 8.93 (d, 1H, J=9.71 Hz, —CH—CH═C—), 8.22 (d, 1H, J=8.22 Hz, —CH—CH═C—), 8.21 (d, 1H, J=8.22 Hz, —CH—CH═CH—), 7.98 (t, 1H, J=6.72 Hz, —CH—CH═CH—), 7.87 (t, 1H, J=8.96 Hz, —CH—CH═CH—), 3.78 (t, 2H, J=5.23 Hz, —N—$CH_2$—$CH_2$—), 2.85 (s, 6H, —N—$(CH_3)_2$), 2.68 (t, 2H, J=5.54 Hz, —$CH_2$—$CH_2$—N═), 2.1 (m, 2H, J=4.33 Hz, —$CH_2$—$CH_2$—$CH_2$—).

Preparation Example 10: Preparation of Palladium Complex C10

10-1: Preparation of Ligand L10

Ligand L10 was prepared by the following method with reference to T. Laine, U. Piironen, K. Lappalainen, M. Klinga, E. Aitola, and M. Lekela, *Journal of Organometallic Chemistry,* 606 (2000), 112-124.

First, 2-pyridinecarboxaldehyde (0.214 g, 2.0 mmol) dissolved in $CH_2Cl_2$ (10.0 ml), and a solution in which 2,6-dimethylaniline (0.242 g, 2.0 mmol) dissolved in $CH_2Cl_2$ (10.0 ml) was mixed therewith. The resulting mixture was refluxed at 40° C. and reacted with stirring for 48 hours. After completion of the reaction, $MgSO_4$ was added to the reaction product, filtered through filter paper, and concentrated under reduced pressure to obtain ligand L10 (0.3602 g, 79%), a yellow oil represented by Formula 6A.

$^1$H NMR ($CDCl_2$, 500 MHz): δ 8.66 (d, 1H, J=6.77 Hz, —C═N—CH═C) 8.29 (s, 1H, —C—N═CH—C), 8.22 (d, 1H, J=7.45 Hz, —C—CH═CH—), 7.78 (t, 1H, J=8.12 Hz, —CH—CH═CH═), 7.34 (t, 1H, J=7.45 Hz, —CH—CH═CH—), 7.02 (d, 2H, J=8.80 Hz, ═C—CH═CH—), 6.91 (t, 1H, J=8.80 Hz, —CH—CH═CH—), 2.10 (s, 6H, —C—$CH_3$).

10-2: Preparation of Palladium Complex C10

Palladium complex C10 was prepared by the following method with reference to T. Laine, U. Piironen, K. Lappalainen, M. Klinga, E. Aitola, and M. Lekela, *Journal of Organometallic Chemistry,* 606 (2000), 112-124.

Ligand L10 (0.210 g, 1.00 mmol) obtained in Preparation Example 10-1 dissolved in anhydrous ethanol (10.0 ml), added to $Pd(MeCN)_2Cl_2$ (0.259 g, 1.00 mmol) dissolving in anhydrous ethanol (10.0 ml), and reacted with stirring at room temperature for 24 hours. After completion of the reaction, the resulting yellow solid powder was filtered, washed twice with cold ethanol (20.0 ml), and washed three times with diethyl ether (20.0 ml). After washing, the resulting product was dried in a vacuum oven to prepare palladium complex C10 (0.278 g, 72%) represented by Formula 3A.

$^1H$ NMR (DMSO, 500 MHz): δ 9.06(d, 1H, J=6.57 Hz, —C═N—CH═C) 8.68 (s, 1H, —C—N═CH—C), 8.42 (t, 1H, J=8.21 Hz, —CH—CH═CH—), 8.15 (d, 1H, J=9.85 Hz, —CH—CH═C—), 7.99 (t, 1H, J=6.57 Hz, —CH—CH═CH—), 7.02 (t, 1H, J=6.57 Hz, —CH—CH═CH—), 6.91 (d, 2H, J=8.21 Hz, ═C—CH═CH—), 2.27 (s, 6H, —C—$CH_3$).

Preparation Example 11: Preparation of Palladium Complex C11

11-1: Preparation of Ligand L11

Ligand L11 was prepared by the following method with reference to W. Massa, S. Dehghanpour, and K. Jahani, *Inorganica Chimica Acta,* 362 (2009), 2872-2878.

First, cyclopentylamine (0.170 g, 2.0 mmol) dissolved in $CH_2Cl_2$ (50.0 ml), and a solution in which 2-pyridinecarboxaldehyde (0.221 g, 2.00 mmol) dissolved in $CH_2Cl_2$ (50.0 ml) was mixed therewith. The resulting mixture reacted with stirring at room temperature for 72 hours. After completion of the reaction, $MgSO_4$ was added to the reaction product, filtered through filter paper, and concentrated under reduced pressure to obtain ligand L11 (0.3167 g, 81%), a yellow oily liquid represented by Formula 6B.

$^1H$ NMR ($CDCl_3$, 500 MHz): δ 8.51 (d, 1H, J=5.48 Hz, —C═N—CH═C) 8.27 (s, 1H, —C—N═CH—C), 7.87 (d, 1H, J=7.92 Hz, —C—CH═CH—), 7.60 (t, 1H, J=7.55 Hz, —CH—CH═CH—), 7.17 (t, 1H, J=6.65 Hz, —CH—CH═CH—), 3.75 (m, 1H, J=6.35 Hz, —$CH_2$—CH—$CH_2$), 1.77 (m, 4H, —$CH_2$—$CH_2$—CH—), 1.57 (m, 4H, —$CH_2$—$CH_2$—$CH_2$—).

11-2: Preparation of Palladium Complex C11

Palladium complex C11 was prepared by the following method with reference to S. Kim, E. Kim, H. J. Lee, and H, Lee, *Polyhedron,* 69 (2014), 149-155.

Ligand L11 (0.174 g, 1.00 mmol) obtained in Preparation Example 11-1 dissolved in anhydrous ethanol (10.0 ml), added to $Pd(MeCN)_2Cl_2$ (0.259 g, 1.00 mmol) dissolving in anhydrous ethanol (10.0 ml), and reacted with stirring at room temperature for 24 hours. After completion of the reaction, the resulting yellow solid powder was filtered, washed twice with cold ethanol (20.0 ml), and washed three times with diethyl ether (20.0 ml). After washing, the resulting product was dried in a vacuum oven to prepare palladium complex C11 (0.266 g, 76%) represented by Formula 3B.

$^1H$ NMR (DMSO, 500 MHz): δ 8.97 (d, 1H, J=5.42 Hz, —C═N—CH═C) 8.53 (s, 1H, —C—N═CH—C), 8.34 (t, 1H, J=8.12 Hz, —CH—CH═CH—), 8.12 (d, 1H, J=8.12 Hz, —C—CH═CH—), 7.84 (t, 1H, J=5.96 Hz, —CH—CH═CH—), 4.64 (m, 1H, J=4.87 Hz, —$CH_2$—CH—$CH_2$), 2.04 (m, 4H, —$CH_2$—$CH_2$—CH—), 1.88 (m, 4H, —$CH_2$—$CH_2$—CH—), 1.73 (m, 4H, —$CH_2$—$CH_2$—$CH_2$—) 1.63 (m, 4H, —$CH_2$—$CH_2$—$CH_2$—),

Example 1-1: Preparation of Norbornene (NB) Polymer Using Cobalt Complex

Norbornene was polymerized using each cobalt complex prepared in Preparation Examples 1 to 4 as a catalyst.

First, the complex catalyst (15 μmol) was put into a Schlenk flask under an argon and vacuum atmosphere. Then, 5 ml of toluene (scavenger: MMAO) was added to dissolve the complex catalyst. 3.1 ml of modified methylaluminoxane (MMAO) was injected thereinto, followed by stirring the resulting product in a bath at a temperature of 90° C. for 30 minutes. 1.42 g of norbornene was added to another Schlenk flask under the same atmosphere, and stirred in a bath at a temperature of 90° C. for 30 minutes by adding 0.63 ml of tetralin and 15 ml of toluene. Then, the activated complex catalyst was injected and stirred in a bath at a temperature of 90° C. for 18 hours to perform the reaction. After terminating the reaction by injecting hexane (2 ml+2 ml Ar), the polymer obtained by the reaction was added to a solution containing hexane (500 ml) and HCl (5 ml), stirred for at least 30 minutes, and dried in vacuo under reduced pressure to prepare a final polymer.

In this case, the polymerization reaction results were measured by NMR. The results thereof are shown in Table 1 as the yield and conversion rate of the norbornene polymer with respect to each catalyst. In addition, FIG. 7 shows the conversion rate of the norbornene polymerization reaction using the cobalt complex catalyst prepared in Preparation Example 1.

TABLE 1

| Classification | Conversion rate (%) | Yield (%) |
|---|---|---|
| Cobalt complex (C1) of Preparation Example 1 | 78.2 | 68.0 |
| Cobalt complex (C2) of Preparation Example 2 | 70.6 | 93.1 |
| Cobalt complex (C3) of Preparation Example 3 | 46.7 | 83.0 |
| Cobalt complex (C4) of Preparation Example 4 | 64.7 | 64.5 |

Example 1-2: Preparation of Norbornene (NB) Polymer Using Cobalt Complex

Norbornene was polymerized using each cobalt complex prepared in Preparation Examples 1 to 4 as a catalyst.

First, the complex catalyst (15 μmol) and norbornene (15 mmol) were put into a Schlenk flask under an argon and vacuum atmosphere. Then, 20 ml of chlorobenzene (scavenger: MMAO) was added to dissolve the complex catalyst and the monomer. 3.1 ml of modified methylaluminoxane (MMAO) was injected thereinto, followed by stirring the resulting product in a bath at a temperature of 25° C. for 2 hours. Next, the polymer obtained by the reaction was added to a solution containing ethanol (500 ml) and HCl (5 ml) by injecting 2 ml of ethanol twice, stirred for at least 30 minutes, and dried in vacuo under reduced pressure to prepare a final polymer.

In this case, the polymerization reaction results were measured by the weight of the polymer. In addition, the results thereof are shown in Table 2 as the yield of the norbornene polymer with respect to each catalyst.

TABLE 2

| Classification | Yield (%) |
| --- | --- |
| Cobalt complex (C1) of Preparation Example 1 | 89.1 |
| Cobalt complex (C2) of Preparation Example 2 | 69.3 |
| Cobalt complex (C3) of Preparation Example 3 | 36.3 |
| Cobalt complex (C4) of Preparation Example 4 | 86.4 |

Example 1-3: Preparation of Norbornene (NB) Polymer Using Palladium Complex

Norbornene was polymerized using each palladium complex prepared in Preparation Examples 5, 10, and 11 as a catalyst.

First, the complex catalyst (50 μmol) was put into a 20-ml test tube under an argon and vacuum atmosphere. Then, 1 ml of toluene was added to dissolve the complex catalyst. 941.6 mg of norbornene was put into another test tube under a nitrogen atmosphere and dissolved by adding 3.49 ml of toluene. Next, the solution in which norbornene dissolved was transferred to the test tube in which the catalyst dissolved, using a syringe, and 0.51 ml of modified methylaluminoxane (MMAO) was injected thereinto to perform polymerization in an oil bath at a temperature of 80° C. for 4 hours. After completion of the reaction, 1 ml of methanol was added to inactivate MMAO, and the resulting product was stirred for 30 minutes. The synthesized norbornene polymer was precipitated in methanol, recovered through a filter, and finally obtained by being dried in a drying oven at a temperature of 80° C.

In this case, the polymerization reaction results were measured by NMR. In addition, the results thereof are shown in Table 3 as the conversion rate of the norbornene polymer with respect to each catalyst.

TABLE 3

| Classification | Conversion rate (%) |
| --- | --- |
| Palladium complex (C5) of Preparation Example 5 | 78.0 |
| Palladium complex (C10) of Preparation Example 10 | 84.3 |
| Palladium complex (C11) of Preparation Example 11 | 82.7 |

Example 1-4: Preparation of Norbornene (NB) Polymer Using Palladium Complex

Norbornene was polymerized using each palladium complex prepared in Preparation Examples 5 to 9 as a catalyst.

First, the complex catalyst (15 μmol) was put into a Schlenk flask under an argon and vacuum atmosphere. Then, 5 ml of toluene (scavenger: MMAO) was added to dissolve the complex catalyst. 3.1 ml of modified methylaluminoxane (MMAO) was injected thereinto, followed by stirring the resulting product in a bath at a temperature of 90° C. for 30 minutes. 1.42 g of norbornene was added to another Schlenk flask under the same atmosphere, and stirred in a bath at a temperature of 90° C. for 30 minutes by adding 0.63 ml of tetralin and 15 ml of toluene. Then, the activated complex catalyst was injected and stirred in a bath at a temperature of 90° C. for 18 hours to perform the reaction. After terminating the reaction by injecting hexane (2 ml+2 ml Ar), the polymer obtained by the reaction was added to a solution containing hexane (500 ml) and HCl (5 ml), stirred for at least 30 minutes, and dried in vacuo under reduced pressure to prepare a final polymer.

In this case, the polymerization reaction results were measured by NMR. In addition, the results thereof are shown in Table 4 as the yield and conversion rate of the norbornene polymer with respect to each catalyst.

TABLE 4

| Classification | Conversion rate (%) | Yield (%) |
| --- | --- | --- |
| Palladium complex (C5) of Preparation Example 5 | — | 48.0 |
| Palladium complex (C6) of Preparation Example 6 | 56.2 | 52.6 |
| Palladium complex (C7) of Preparation Example 7 | 64.6 | 48.5 |
| Palladium complex (C8) of Preparation Example 8 | 88.4 | 30 |
| Palladium complex (C9) of Preparation Example 9 | 42.9 | 33 |

Example 1-5: Preparation of Norbornene (NB) Polymer Using Palladium Complex

Norbornene was polymerized using each palladium complex prepared in Preparation Examples 5 to 8 as a catalyst.

First, the complex catalyst (15 μmol) and norbornene (15 mmol) were put into a Schlenk flask under an argon and vacuum atmosphere. 20 ml of chlorobenzene (scavenger: MMAO) was added to dissolve the complex catalyst and the monomer, and then 0.2 ml of tetralin was injected. 3.1 ml of modified methylaluminoxane (MMAO) was injected thereinto, followed by stirring the resulting product in a bath at a temperature of 25° C. for 2 hours. After terminating the reaction by injecting 2 ml of ethanol two times, the polymer obtained by the reaction was added to a solution containing ethanol (500 ml) and HCl (5 ml), stirred for at least 30 minutes, and dried in vacuo under reduced pressure to prepare a final polymer.

In this case, the polymerization reaction results were measured by NMR. The results thereof are shown in Table 5 as the yield and conversion rate of the norbornene polymer with respect to each catalyst. In addition, FIG. 8 shows the conversion rate of the norbornene polymerization reaction using the palladium complex catalyst prepared in Preparation Example 5.

TABLE 5

| Classification | Conversion rate (%) | Yield (%) |
| --- | --- | --- |
| Palladium complex (C5) of Preparation Example 5 | 96.0 | 91.2 |
| Palladium complex (C6) of Preparation Example 6 | 93.7 | 91.5 |
| Palladium complex (C7) of Preparation Example 7 | 95.7 | 90.5 |
| Palladium complex (C8) of Preparation Example 8 | 91.8 | 89.4 |

Example 1-6: Preparation of Norbornene (NB) Polymer Using Palladium Complex

Norbornene was polymerized using each palladium complex prepared in Preparation Examples 5 to 8 as a catalyst.

First, the complex catalysts (1.88 μmol, 3.75 μmol, and 15 μmol) and norbornene (15 mmol) were put into each Schlenk flask under an argon and vacuum atmosphere. Then, 20 ml of chlorobenzene (scavenger: MMAO) was added to dissolve the complex catalyst and the monomer. 3.1 ml of modified methylaluminoxane (MMAO) was injected thereinto, followed by stirring the resulting product in a bath at a temperature of 25° C. for 2 hours. After terminating the reaction by injecting 2 ml of ethanol two times, the polymer obtained by the reaction was added to a solution containing ethanol (500 ml) and HCl (5 ml), stirred for at least 30 minutes, and dried in vacuo under reduced pressure to prepare a final polymer.

In this case, the polymerization reaction results were measured by the weight of the polymer. In addition, the results thereof are shown in Table 6 as the yield of the norbornene polymer with respect to each catalyst.

TABLE 6

| | Yield depending on catalyst content (%) | | |
|---|---|---|---|
| Classification | 15 μmol | 3.75 mol | 1.88 mol |
| Palladium complex (C5) of Preparation Example 5 | 97.2 | 95.1 | 94.6 |
| Palladium complex (C6) of Preparation Example 6 | 96.6 | 94.2 | 93.9 |
| Palladium complex (C7) of Preparation Example 7 | 98.3 | 97.3 | 96.8 |
| Palladium complex (C8) of Preparation Example 8 | 93.1 | 92.1 | 94.2 |

Example 2-1: Preparation of Methyl Norbornene (MeNB) Polymer Using Cobalt Complex Methyl norbornene was polymerized using each cobalt complex prepared in Preparation Examples 1 to 4 as a catalyst. First, the complex catalyst (15 μmol) was put into a Schlenk flask under an argon and vacuum atmosphere. Then, 20 ml of toluene (scavenger: MMAO) was added to dissolve the complex catalyst. 3.1 ml of modified methylaluminoxane (MMAO) was injected thereinto, followed by stirring the resulting product in a bath at a temperature of 90° C. for 30 minutes. 2.2 ml of methyl norbornene (MeNB) and 0.21 ml of tetralin were added thereto and stirred in a bath at a temperature of 90° C. for 2 hours to perform the reaction. After terminating the reaction by injecting hexane (2 ml+2 ml Ar), the polymer obtained by the reaction was added to a solution containing hexane (Hex) (500 ml) and HCl (5 ml), stirred for at least 30 minutes, and then dried in vacuo under reduced pressure to prepare a final polymer.

In this case, the polymerization reaction results were measured by NMR. In addition, the results thereof are shown in Table 7 as the yield and conversion rate of the methyl norbornene polymer with respect to each catalyst.

TABLE 7

| Classification | Conversion rate (%) | Yield (%) |
|---|---|---|
| Cobalt complex (C1) of Preparation Example 1 | 8.6 | 30.8 |
| Cobalt complex (C2) of Preparation Example 2 | 22.6 | 40.8 |
| Cobalt complex (C3) of Preparation Example 3 | 12.6 | 41.2 |
| Cobalt complex (C4) of Preparation Example 4 | 24.2 | — |

Example 2-2: Preparation of Methyl Norbornene (MeNB) Polymer Using Palladium Complex Methyl norbornene was polymerized using each palladium complex prepared in Preparation Examples 5 to 9 as a catalyst. First, the complex catalyst (15 μmol) was put into a Schlenk flask under an argon and vacuum atmosphere. Then, 5 ml of toluene (scavenger: MMAO) was added to dissolve the complex catalyst. 3.1 ml of modified methylaluminoxane (MMAO) was injected thereinto, followed by stirring the resulting product in a bath at a temperature of 90° C. for 30 minutes. 2.2 ml of methyl norbornene (MeNB) was put into another Schlenk flask under the same atmosphere, stirred in a bath at a temperature of 90° C. for 30 minutes by adding 0.63 ml of tetralin and 15 ml of toluene, and dissolved. Then, the activated complex catalyst was injected and stirred in a bath at a temperature of 90° C. for 18 hours to perform the reaction. After terminating the reaction by injecting hexane (2 ml+2 ml Ar), the polymer obtained by the reaction was added to a solution containing hexane (Hex) (500 ml) and HCl (5 ml), stirred for at least 30 minutes, and dried in vacuo under reduced pressure to prepare a final polymer.

In this case, the polymerization reaction results were measured by NMR. In addition, the results thereof are shown in Table 8 as the yield and conversion rate of the methyl norbornene polymer with respect to each catalyst.

TABLE 8

| Classification | Conversion rate (%) | Yield (%) |
|---|---|---|
| Palladium complex (C5) of Preparation Example 5 | 54.0 | 39.0 |
| Palladium complex (C6) of Preparation Example 6 | 6.6 | 36.4 |
| Palladium complex (C7) of Preparation Example 7 | 4.4 | 40 |
| Palladium complex (C8) of Preparation Example 8 | 6.9 | 18.5 |
| Palladium complex (C9) of Preparation Example 9 | 30 | 30 |

Example 3-1: Preparation of Copolymer of Norbornene (NB) and Methyl Norbornene (MeNB) Using Cobalt Complex Norbornene and methyl norbornene were copolymerized using each cobalt complex prepared in Preparation Examples 1 to 4 as a catalyst.

First, the complex catalyst (15 μmol) was put into a Schlenk flask under an argon and vacuum atmosphere. Then, 5 ml of toluene (scavenger: MMAO) was added to dissolve the complex catalyst. 3.1 ml of modified methylaluminoxane (MMAO) was injected thereinto, followed by stirring the resulting product in a bath at a temperature of 90° C. for 30 minutes. 0.71 g of norbornene and 1.141 g of methyl norbornene (MeNB) were put into another Schlenk flask under the same atmosphere, stirred in a bath at a temperature of 90° C. for 30 minutes by adding 0.21 ml of tetralin and 15 ml of toluene, and dissolved. Then, the activated complex catalyst was injected and stirred in a bath at a temperature of 90° C. for 18 hours to perform the reaction. After terminating the reaction by injecting hexane (2 ml+2 ml Ar), the polymer obtained by the reaction was added to a solution containing hexane (Hex) (500 ml) and HCl (5 ml), stirred for at least 30 minutes, and dried in vacuo under reduced pressure to prepare a final polymer.

In this case, the polymerization reaction results were measured by NMR. In addition, the results thereof are shown in Table 9 as the yield and conversion rate of the copolymer of norbornene and methyl norbornene with respect to each catalyst.

TABLE 9

| Classification | Conversion rate (%) | Yield (%) |
|---|---|---|
| Cobalt complex (C1) of Preparation Example 1 | 18.3 (NB:MeNB = 30%:10%) | 40 |
| Cobalt complex (C2) of Preparation Example 2 | 35.5 (NB:MeNB = 47.2%:29%) | 53.7 |
| Cobalt complex (C3) of Preparation Example 3 | 24.7 (NB:MeNB = 4.1%:25.2%) | 24 |
| Cobalt complex (C4) of Preparation Example 4 | 33.5 (NB:MeNB = 30.7%:37.0%) | 24 |

Example 3-2: Preparation of Copolymer of Norbornene (NB) and Methyl Norbornene (MeNB) Using Palladium Complex Norbornene and methyl norbornene were copolymerized using each palladium complex prepared in Preparation Examples 5 to 9 as a catalyst.

First, the complex catalyst (15 μmol) was put into a Schlenk flask under an argon and vacuum atmosphere. Then, 5 ml of toluene (scavenger: MMAO) was added to dissolve the complex catalyst. 3.1 ml of modified methylaluminoxane (MMAO) was injected thereinto, followed by stirring the resulting product in a bath at a temperature of 90° C. for 30 minutes. 0.71 g of norbornene and 1.141 g of methyl norbornene (MeNB) were put into another Schlenk flask under the same atmosphere, stirred in a bath at a temperature of 90° C. for 30 minutes by adding 0.21 ml of tetralin and 15 ml of toluene, and dissolved. Then, the activated complex catalyst was injected and stirred in a bath at a temperature of 90° C. for 18 hours to perform the reaction. After terminating the reaction by injecting hexane (2 ml+2 ml Ar), the polymer obtained by the reaction was added to a solution containing hexane (Hex) (500 ml) and HCl (5 ml), stirred for at least 30 minutes, and dried in vacuo under reduced pressure to prepare a final polymer.

In this case, the polymerization reaction results were measured by NMR. In addition, the results thereof are shown in Table 10 as the yield and conversion rate of the copolymer of norbornene and methyl norbornene with respect to each catalyst.

TABLE 10

| Classification | Conversion rate (%) | Yield (%) |
|---|---|---|
| Palladium complex (C5) of Preparation Example 5 | 22.0 | 57.2 |
| Palladium complex (C6) of Preparation Example 6 | 20.1 | 49.3 |
| Palladium complex (C7) of Preparation Example 7 | 37.7 | 61.3 |
| Palladium complex (C8) of Preparation Example 8 | 45.7 | 33.9 |
| Palladium complex (C9) of Preparation Example 9 | 25.0 | 43.3 |

Example 4-1: Preparation of Butyl Norbornene (BuNB) Polymer Using Palladium Complex Butyl norbornene was polymerized using a palladium complex prepared in Preparation Example 11 as a catalyst.

First, the complex catalyst (50 μmol) was put into a 20-ml test tube under an argon and vacuum atmosphere. Then, 1 ml of toluene was added to dissolve the complex catalyst. 1502.6 mg of butyl norbornene was added to another test tube under a nitrogen atmosphere, and dissolved by adding 3.49 ml of toluene. Next, the solution in which norbornene dissolved was transferred to the test tube in which the catalyst dissolved, using a syringe, and 0.51 ml of modified methylaluminoxane (MMAO) was added to perform polymerization in an oil bath at a temperature of 80° C. for 2 hours. After completion of the reaction, 1 ml of methanol was added to inactivate MMAO, and the resulting product was stirred for 30 minutes. The synthesized norbornene polymer was precipitated in methanol, recovered through a filter, and finally obtained by being dried in a drying oven at a temperature of 80° C.

In this case, the polymerization reaction result was measured by NMR. The conversion rate of butyl norbornene was found to be 80.6%.

Example 4-2: Preparation of Butyl Norbornene (BuNB) Polymer Using Palladium Complex Butyl norbornene was polymerized using each palladium complex prepared in Preparation Examples 5 to 8 as a catalyst.

First, the complex catalyst (15 μmol) and butyl norbornene (15 mmol) were added to a Schlenk flask under an argon and vacuum atmosphere. Then, 20 ml of chlorobenzene (scavenger: MMAO) was added to dissolve the complex catalyst and the monomer. 3.1 ml of modified methylaluminoxane (MMAO) was injected thereinto, followed by stirring the resulting product in a bath at a temperature of 25° C. for 2 hours. After terminating the reaction by injecting 2 ml of ethanol two times, the polymer obtained by the reaction was added to a solution containing ethanol (500 ml) and HCl (5 ml), stirred for at least 30 minutes, and dried in vacuo under reduced pressure to prepare a final polymer.

In this case, the polymerization reaction results were measured by the weight of the polymer. In addition, the results thereof are shown in Table 11 as the yield of the butyl norbornene polymer with respect to each catalyst.

TABLE 11

| Classification | Yield (%) |
|---|---|
| Palladium complex (C5) of Preparation Example 5 | 42.4 |
| Palladium complex (C6) of Preparation Example 6 | 49.3 |
| Palladium complex (C7) of Preparation Example 7 | 40.5 |
| Palladium complex (C8) of Preparation Example 8 | 46.5 |

Example 5: Preparation of Copolymer of Norbornene (NB) and Butyl Norbornene (BuNB) Using Palladium Complex Norbornene and butyl norbornene were copolymerized using each palladium complex prepared in Preparation Examples 5, 10, and 11 as a catalyst.

First, the complex catalyst (50 μmol) was put into a 20-ml test tube under an argon and vacuum atmosphere. Then, 1 ml of toluene was added to dissolve the complex catalyst. 659.0 mg of norbornene and 450.8 mg of butyl norbornene were added to another test tube under a nitrogen atmosphere, and dissolved by adding 3.49 ml of toluene. Next, the solution in which norbornene and butyl norbornene dissolved was transferred to the test tube in which the catalyst dissolved, using a syringe, and 0.51 ml of modified methylaluminoxane (MMAO) was added to perform polymerization in an oil bath at a temperature of 80° C. for 2 hours. After completion of the reaction, 1 ml of methanol was added to inactivate MMAO, and the resulting product was stirred for 30 minutes. The synthesized norbornene polymer was precipitated in methanol, recovered through a filter, and finally obtained by being dried in a drying oven at a temperature of 80° C.

In this case, the polymerization reaction results were measured by NMR. In addition, the results thereof are shown in Table 12 as the conversion rate of the norbornene polymer with respect to each catalyst.

TABLE 12

| Classification | Conversion rate (%) |
|---|---|
| Palladium complex (C5) of Preparation Example 5 | 79.8 |
| Palladium complex (C10) of Preparation Example 10 | 77.7 |
| Palladium complex (C11) of Preparation Example 11 | 75.1 |

As a result, according to the present disclosure, the complex catalyst containing the imine-based ligand for polymerizing the cyclic olefin-based monomer having high activity in polymerizing the cyclic olefin-based monomer may be provided. In addition, in the presence of the complex catalyst containing the imine-based ligand, the cyclic olefin-based monomer may be polymerized to prepare the cyclic olefin-based polymer with high activity.

The present disclosure is not limited by the foregoing embodiments and the accompanying drawings. In addition, those skilled in the art will appreciate that various modifications, additions, and substitutions are possible, without departing from the scope and spirit of the present disclosure.

What is claimed is:

1. A complex catalyst containing an imine-based ligand for polymerizing a cyclic olefin-based monomer, the catalyst comprising a compounds represented by Formula 2A or Formula 2B:

[Formula 2A]

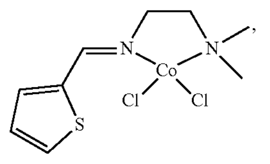

[Formula 2B]

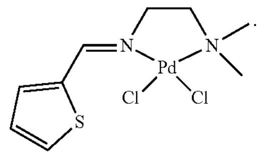

2. The complex catalyst of claim 1, wherein the compound is represented by Formula 2A.

3. The complex catalyst of claim 1, wherein the compound is represented by Formula 2B.

4. A method of preparing a cyclic olefin-based polymer, the method comprising performing addition polymerization of a cyclic olefin-based monomer in the presence of the complex catalyst of claim 1.

5. The method of claim 4, wherein the cyclic olefin-based monomer comprises at least one selected from the group consisting of norbornene, dicyclopentadiene, cyclopentadiene, cyclopentene, cyclobutene, cyclohexene, cycloheptene, cyclooctene, and derivatives thereof.

6. The method of claim 4, wherein the cyclic olefin-based monomer is a compound represented by Formula 7,

[Formula 7]

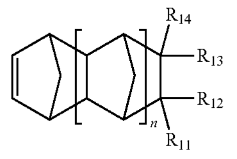

wherein in Formula 7, n is an integer in a range of 0 to 4, and $R_{11}$ to $R_{14}$ are the same or different and are each independently selected from the group consisting of a hydrogen atom, a halogen atom, a hydroxy group, a carboxyl group, a straight-chain or branched-chain alkyl group having 1 to 20 carbon atoms, a cycloalkyl group having 3 to 12 carbon atoms, an aryl group having 6 to 20 carbon atoms, an alkoxy group having 1 to 10 carbon atoms, and an acyl group having 1 to 10 carbon atoms.

7. The method of claim 4, wherein the addition polymerization of the cyclic olefin-based monomer is performed in the presence of a cocatalyst with the complex catalyst.

8. The method of claim 7, wherein the cocatalyst comprises at least one selected from the group consisting of modified methylaluminoxane (MMAO), trimethyl aluminum (TMA), triethyl aluminum (TEA), triisobutylaluminum (TIBAL), dimethyl chloro aluminum (DMCA), and diethyl chloro aluminum (DECA).

9. The method of claim 7, wherein the cocatalyst is modified methylaluminoxane (MMAO).

10. The method of claim 4, wherein the addition polymerization is performed in at least one solvent selected from the group consisting of 1,2-dichlorobenzene, toluene, n-pentane, n-hexane, n-heptane, chlorobenzene, dichloromethane, chloroform, 1,2-dichloroethane, and 1,1,2,2-tetrachloroethane.

* * * * *